(12) United States Patent
Oya et al.

(10) Patent No.: US 9,405,048 B2
(45) Date of Patent: Aug. 2, 2016

(54) REFLECTIVE POLARIZING FILM, AND OPTICAL MEMBER FOR LIQUID CRYSTAL DISPLAY DEVICE, AND LIQUID CRYSTAL DISPLAY DEVICE FORMED FROM SAME

(75) Inventors: Taro Oya, Anpachi-gun (JP);
Mitsumasa Ono, Anpachi-gun (JP);
Tetsuo Yoshida, Anpachi-gun (JP)

(73) Assignee: TEIJIN LIMITED, Osaka (JP)

( * ) Notice: Subject to any disclaimer, the term of this patent is extended or adjusted under 35 U.S.C. 154(b) by 75 days.

(21) Appl. No.: 14/122,799

(22) PCT Filed: Jun. 14, 2012

(86) PCT No.: PCT/JP2012/065186
§ 371 (c)(1),
(2), (4) Date: Nov. 27, 2013

(87) PCT Pub. No.: WO2012/173170
PCT Pub. Date: Dec. 20, 2012

(65) Prior Publication Data
US 2014/0132897 A1    May 15, 2014

(30) Foreign Application Priority Data

Jun. 17, 2011   (JP) .................................. 2011-135606
Jun. 22, 2011   (JP) .................................. 2011-138817
Jun. 22, 2011   (JP) .................................. 2011-138821

(51) Int. Cl.
*C09K 19/00*     (2006.01)
*G02B 5/30*      (2006.01)
*G02F 1/1335*    (2006.01)

(52) U.S. Cl.
CPC .............. *G02B 5/3025* (2013.01); *G02B 5/305* (2013.01); *G02F 1/133536* (2013.01); *G02F 2001/133545* (2013.01); *Y10T 428/10* (2015.01); *Y10T 428/1036* (2015.01)

(58) Field of Classification Search
CPC .... G02B 5/3025; G02B 5/3041; G02B 5/305; G02B 5/3033; G02B 5/3083; G02F 1/133536; G02F 2011/133545; Y10T 428/10; Y10T 428/1041; Y10T 428/1036; Y10T 428/108; Y10T 428/31786; C08G 63/187; C08G 63/672

USPC .............. 428/1.1, 1.3, 1.31, 1.33, 1.5, 1.54, 428/847.3, 847.4; 349/96; 359/488.01, 359/488.11, 489.12, 485.01, 485.03; 528/176, 209

See application file for complete search history.

(56) References Cited

U.S. PATENT DOCUMENTS 5,872,653 A     2/1999   Schrenk et al.
6,486,997 B1    11/2002  Bruzzone et al.
(Continued)

FOREIGN PATENT DOCUMENTS

EP    2272669 A1    1/2011
JP    4-268505 A    9/1992
(Continued)

OTHER PUBLICATIONS

International Search Report of PCT/JP2012/065186 dated Sep. 18, 2012.
(Continued)

*Primary Examiner* — Ruiyun Zhang
(74) *Attorney, Agent, or Firm* — Sughrue Mion, PLLC

(57) ABSTRACT

A multilayered reflective polarizing film is provided that has high polarization performance comparable to that of an absorption-type polarizing plate, and is preferred as a polarizing plate attached to a liquid crystal cell. An optical member for liquid crystal display devices, and a liquid crystal display device formed from such a multilayered reflective polarizing film are also provided. Specifically, the reflective polarizing film includes a uniaxially stretched multilayered film in which a specific aromatic polyester containing (alkylenedioxy)di-2-naphthoic acid as a part of dicarboxylic acid components is used as a first layer, and an optically isotropic polyester having an average refractive index of 1.50 to 1.60 is used as a second layer, and that has a predetermined refractive index difference between the layers. The reflective polarizing film has an angle of orientation of 2 degrees or less.

20 Claims, 2 Drawing Sheets

(56) References Cited

U.S. PATENT DOCUMENTS

| | | | |
|---|---|---|---|
| 6,677,031 | B1 | 1/2004 | Murooka et al. |
| 2001/0008700 | A1 | 7/2001 | Jonza |
| 2006/0061717 | A1 | 3/2006 | Ichihashi |
| 2007/0264447 | A1* | 11/2007 | Oya et al. .................... 428/1.31 |
| 2009/0079909 | A1 | 3/2009 | Ouderkirk et al. |
| 2010/0120967 | A1* | 5/2010 | Kinoshita et al. ............ 524/493 |
| 2010/0190037 | A1 | 7/2010 | Kinoshita et al. |
| 2011/0039127 | A1 | 2/2011 | Kinoshita et al. |

FOREIGN PATENT DOCUMENTS

| | | |
|---|---|---|
| JP | 9-506837 A | 7/1997 |
| JP | 9-507308 A | 7/1997 |
| JP | 2005-316511 A | 11/2005 |
| JP | 2006-62281 A | 3/2006 |
| JP | 2006-119623 A | 5/2006 |
| JP | 2006-215175 A | 8/2006 |
| JP | 2009-103817 A | 5/2009 |
| JP | 2011-84037 A | 4/2011 |
| JP | 2011-126181 A | 6/2011 |
| JP | 2011-126182 A | 6/2011 |
| JP | 2012-13919 A | 1/2012 |
| TW | 459146 B | 10/2001 |
| WO | 95/17303 A1 | 6/1995 |
| WO | 95/17691 A1 | 6/1995 |
| WO | 9517692 A1 | 6/1995 |
| WO | 01/47711 A1 | 7/2001 |
| WO | 2008/153188 A1 | 12/2008 |
| WO | 2009131236 A1 | 10/2009 |

OTHER PUBLICATIONS

Communication dated Jan. 19, 2015 from the European Patent Office in counterpart European Application No. 12800848.9.

* cited by examiner

REFLECTIVE POLARIZING FILM, AND OPTICAL MEMBER FOR LIQUID CRYSTAL DISPLAY DEVICE, AND LIQUID CRYSTAL DISPLAY DEVICE FORMED FROM SAME

CROSS REFERENCE TO RELATED APPLICATIONS

This is a National Stage of International Application No. PCT/JP2012/065186 filed Jun. 14, 2012 (claiming priority based on Japanese Patent Application No. 2011-135606 filed Jun. 17, 2011, Japanese Patent Application No. 2011-138817 filed Jun. 22, 2011 and Japanese Patent Application No. 2011-138821 filed Jun. 22, 2011), the contents of which are incorporated herein by reference in their entirety.

TECHNICAL FIELD

The present invention relates to a reflective polarizing film that includes a uniaxially stretched multilayered film of high polarization performance suited for bonding to a liquid crystal cell. The invention also relates to an optical member for liquid crystal display devices, and a liquid crystal display device formed from such a reflective polarizing film.

BACKGROUND ART

Liquid crystal display devices (LCDs) used for devices such as television, personal computers, and cell phones display a visual image by controlling the transmission amount of emitted light from a light source with the use of a liquid crystal panel that includes a pair of polarizing plates disposed on the both sides of a liquid crystal cell. The polarizing plates attached to the liquid crystal cell are commonly absorption-type polarizing plates, or photoabsorption-type dichroic linear polarizing plates as they are often called. Polarizing plates that use triacetyl cellulose (TAC) for the protection of iodine-containing PVA are widely used.

The absorption-type polarizing plates pass polarized light of the polarization direction along the transmission axis, and absorb most of the polarized light orthogonal to the transmission axis. Because close to 50% of the unpolarized light emitted by a light source unit is absorbed by the absorption-type polarizing plates, the efficiency of using light is poor, as has been pointed out in the past. For more effective use of polarized light orthogonal to the transmission axis, there have been studies of a configuration, referred to by the common name brightness enhancement film, that uses a reflection-type polarizer between a light source and a liquid crystal panel. One example of such a reflection-type polarizer is a polymer-type film that takes advantage of optical interference (see, for example, Patent Document 1).

Concerning the polarizing plates attached to a liquid crystal cell, various laminate configurations have also been studied in which an absorption-type polarizing plate and a reflection-type polarizing plate are combined according to, for example, the type of the light used for the display device, and the intended use of the display device, such as in a reflection display that makes use of outside light, and a transmission display that uses a backlight.

For example, Patent Document 2 discloses a liquid crystal display device in which an electric field is applied to the liquid crystal layer to vary the retardation value of the liquid crystal and shift the retardation of the incident polarized light on the liquid crystal layer by a certain amount. As an example of the polarizing plates used on the both sides of the liquid crystal layer, the publication describes a reflection-type polarizing plate of a planar multilayer structure provided on the side of the light source and that includes three or more layers of films having birefringence, and an absorption-type polarizing plate provided on the opposite side relative to the liquid crystal layer.

Patent Document 3 describes solving the warping of polarizing plates caused by the difference in the extent of temperature-dependent expansion and contraction of an absorption-type polarizing plate and a reflection-type polarizing plate disposed on the both sides of a liquid crystal cell that includes a liquid crystal between flexible substrates. The publication proposes solving the warping by combining these polarizing plates in a specific laminate configuration. The publication also discloses a birefringent dielectric multilayer film, specifically a brightness enhancement film, as an example of the reflection-type polarizing plate.

For example, patent documents 4 to 6 disclose reflective polarizing polymer films of a birefringent multilayer configuration, specifically films that function to reflect polarized light of one direction, and pass polarized light of another direction.

If the absorption-type polarizing plate used as the polarizing plate attached to the liquid crystal cell were to be replaced solely by a reflection-type polarizing plate of a multilayer configuration, the reflection-type polarizing plate needs to have a degree of polarization comparative to that of the absorption-type polarizing plate.

Patent Document 1: JP-T-09-507308 (the term "JP-T" as used herein means a published Japanese translation of a PCT patent application)
Patent Document 2: JP-A-2005-316511
Patent Document 3: JP-A-2009-103817
Patent Document 4: JP-A-04-268505
Patent Document 5: JP-T-9-506837
Patent Document 6: WO2001/47711

DISCLOSURE OF THE INVENTION

Problems that the Invention is to Solve

It is an object of the present invention to provide a multi-layered reflective polarizing film having high polarization performance comparable to that of an absorption-type polarizing plate and preferred for use as a polarizing plate attached to a liquid crystal cell. An object of the invention is also to provide an optical member for liquid crystal display devices, and a liquid crystal display device formed from the multilayered reflective polarizing film.

A second object of the present invention is to provide a reflective polarizing film having high polarization performance comparable to that of an absorption-type polarizing plate, and particularly suited as a reflective polarizing plate for IPS mode liquid crystal displays with its further improved polarization performance realized by focusing on the relatively thick layer forming the outermost layer of the multi-layered reflective polarizing film, and by controlling the thickness of the outermost layer, and the retardation in the in-plane direction of the outermost layer.

A third object of the present invention is to provide a reflective polarizing film having high polarization performance comparable to that of an absorption-type polarizing plate, and particularly suited as a reflective polarizing plate for VA mode liquid crystal displays without having the need to use a retardation plate as an additional optical member. The object is achieved by focusing on the relatively thick layer forming the outermost layer of the multilayered reflective polarizing film, and by controlling the thickness of the outermost layer, and the retardation in the in-plane direction and the thickness direction of the outermost layer within certain ranges.

A fourth object of the present invention is to provide a multilayered reflective polarizing film having high polarization performance comparable to that of an absorption-type polarizing plate, and that has excellent heat-resisting dimensional stability and is preferred as a polarizing plate attached to a liquid crystal cell.

Means for Solving the Problems

The present inventors conducted intensive studies to solve the foregoing problems, and found that a multilayer reflective polarizing film that includes a uniaxially stretched multilayered film can solely be used as a polarizing plate of a liquid crystal cell by improving reflection and polarization performance with the reflective polarizing film that uses the uniaxially stretched multilayered film of the present invention characterized by the polymer material of a first layer, and by confining the polarization axis of the uniaxially stretched multilayered film within a certain angle range on the basis of the finding that the uniformity of polarization axes affects the polarization performance of the reflective polarizing film. The present invention was completed on the basis of these findings.

With regard to the second object, it was found that the object can be achieved when the thickness and the orientation state of a relatively thick layer forming the outermost layer of the uniaxially stretched multilayered film are controlled to make the in-plane direction retardation 0 nm or more and less than 20 nm. The present invention was completed on the basis of this finding.

With regard to the third object, it was found that the object can be achieved when the thickness and the orientation state of a relatively thick layer forming the outermost layer of the uniaxially stretched multilayered film are controlled to make the in-plane direction retardation 0 nm or more and 30 nm or less, and the thickness direction retardation 50 nm or more and 350 nm or less. The present invention was completed on the basis of this finding.

With regard to the fourth object, it was found that the object can be achieved when a copolymerized polyester of a specific copolymer amount having a glass transition point of 80° C. or more is used as the polyester that forms a second layer of the uniaxially stretched multilayered film. The present invention was completed on the basis of this finding.

Specifically, the objects of the present invention can be achieved with a reflective polarizing film (Item 1) that includes a uniaxially stretched multilayered film as a laminate of at least 251 alternately laminated first layers and second layers, in which:

1) the first layers of the uniaxially stretched multilayered film are formed of a polyester containing dicarboxylic acid components and a diol component, (i) the dicarboxylic acid components containing 5 mol % to 50 mol % of a component represented by the following formula (A), and 50 mol % to 95 mol % of a component represented by the following formula (B),

[Chemical Formula 1]

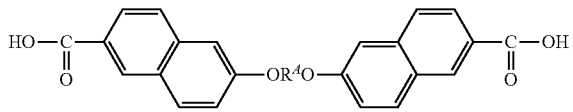

(A)

(wherein $R^A$ represents an alkylene group of 2 to 4 carbon atoms),

[Chemical Formula 2]

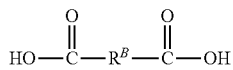

(B)

(wherein $R^B$ represents a naphthalenediyl group), (ii) the diol component containing 90 mol % to 100 mol % of a component represented by the following formula (C),

[Chemical Formula 3]

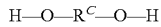

(C)

(wherein $R^C$ represents an alkylene group of 2 to 4 carbon atoms), 2) the second layers of the uniaxially stretched multilayered film are formed of an optically isotropic polyester having an average refractive index of 1.50 to 1.60, 3) the refractive index difference between the first layers and the second layers is 0.10 to 0.45 in a uniaxial stretch direction (X direction) within a film plane, and is 0.05 or less in a direction (Y direction) orthogonal to the uniaxial stretch direction, and in a film thickness direction (Z direction), and 4) the reflective polarizing film has an angle of orientation of 2 degrees or less.

Further, the reflective polarizing film of the present invention includes at least one of the following preferred aspects of Items 2 to 16.

2. The reflective polarizing film according to Item 1, comprising an outermost layer on at least one of the surfaces of the uniaxially stretched multilayered film,
wherein the retardation (Re) of the outermost layer as represented by the following formula (1) is 0 nm or more and less than 20 nm, $$\text{retardation}(Re)=|nTD-nMD|\times 1000\times d \qquad (1)$$

(wherein nMD and nTD represent the refractive indices of the outermost layer in a machine direction and a width direction, respectively, and d represents the thickness (μm) of the outermost layer), and
wherein the outermost layer has a thickness of 2 μm to 10 μm.

3. The reflective polarizing film according to Item 2, wherein the retardation (Rth) of the outermost layer in the thickness direction as represented by the following formula (2) is 0 nm or more and less than 50 nm, $$\text{retardation}(Rth)=((nMD+nTD)/2-nZ)\times 1000\times d \qquad (2)$$

(wherein nMD, nTD, and nZ represent the refractive indices of the outermost layer in the machine direction, the width direction, and the thickness direction, respectively, and d represents the thickness (μm) of the outermost layer).

4. A reflective polarizing plate for IPS mode liquid crystal displays, wherein the reflective polarizing plate is formed from the reflective polarizing film of Item 2 or 3.

5. The reflective polarizing film according to Item 1, comprising an outermost layer on at least one of the surfaces of the uniaxially stretched multilayered film, wherein the retardation (Re) of the outermost layer as represented by the following formula (1) is 0 nm to 30 nm, and the retardation (Rth) of the outermost layer in the thickness direction as represented by the following formula (2) is 50 nm to 350 nm, $$\text{retardation}(Re) = |nTD - nMD| \times 1000 \times d \quad (1)$$

(wherein nMD and nTD represent the refractive indices of the outermost layer in a machine direction and a width direction, respectively, and d represents the thickness (μm) of the outermost layer), $$\text{retardation}(Rth) = ((nMD + nTD)/2 - nZ) \times 1000 \times d \quad (2)$$

(wherein nMD, nTD, and nZ represent the refractive indices of the outermost layer in the machine direction, the width direction, and the thickness direction, respectively, and d represents the thickness (μm) of the outermost layer), and wherein the outermost layer has a thickness of 5 μm to 50 μm.

6. A reflective polarizing film for VA mode liquid crystal displays, wherein the reflective polarizing film is formed from the reflective polarizing film of Item 5.

7. A reflective polarizing plate for VA mode liquid crystal displays, wherein the reflective polarizing plate is formed from the reflective polarizing film of Item 5.

8. The reflective polarizing film according to any one of Items 1 to 7, wherein the average reflectance at 400 to 800 nm wavelengths for polarized light incident at 0 degree angle and reflected at the film surface of reflective polarizing film is 95% or more with regard to a polarized component parallel to an incident plane that includes the uniaxial stretch direction (X direction), and wherein the average reflectance at 400 to 800 nm wavelengths for the polarized light incident at 0 degree angle and reflected at the film surface of reflective polarizing film is 12% or less with regard to a polarized component perpendicular to the incident plane that includes the X direction.

9. The reflective polarizing film according to any one of Items 1 to 6, wherein the polyester forming the second layers is a polyester that contains copolymerized polyethylene terephthalate as a main component.

10. The reflective polarizing film according to Item 2 or 5, wherein the outermost layer is formed of amorphous thermoplastic resin.

11. The reflective polarizing film according to any one of Items 1 to 6, wherein the polyester forming the second layers is a copolymerized polyester with a copolymer amount of 5 mol % to 85 mol % and having a glass transition point of 80° C. or more.

12. The reflective polarizing film according to Item 11, wherein the reflective polarizing film has a rate of thermal shrinkage of 1.5% or less under 85° C., 30 minute conditions.

13. The reflective polarizing film according to Item 11 or 12, wherein the copolymerized polyester forming the second layer is a copolymerized polyethylene terephthalate that contains alicyclic diol as a copolymer component.

14. The reflective polarizing film according to Item 13, wherein the copolymer component forming the copolymerized polyethylene terephthalate is at least one selected from the group consisting of spiroglycol, tricyclodecane dimethanol, and cyclohexane dimethanol.

15. The reflective polarizing film according to Item 11 or 12, wherein the copolymerized polyester forming the second layers is a copolymerized polyethylene naphthalate that contains at least one of alicyclic dicarboxylic acid and alicyclic diol as a copolymer component.

16. The reflective polarizing film according to Item 15, wherein the copolymer component forming the copolymerized polyethylene naphthalate is at least one selected from the group consisting of cyclohexane dicarboxylic acid, decahydronaphthalene dicarboxylic acid, spiroglycol, tricyclodecane dimethanol, and cyclohexane dimethanol.

The present invention also encompasses an optical member for liquid crystal display devices, the optical member comprising a first polarizing plate formed from the reflective polarizing film of Item 1, a liquid crystal cell, and a second polarizing plate, wherein the first polarizing plate, the liquid crystal cell, and the second polarizing plate are laminated in this order.

The present invention also encompasses a liquid crystal display device, comprising a light source, and the optical member for liquid crystal display devices according to the present invention, wherein the first polarizing plate is disposed on the side of the light source.

Advantage of the Invention

The reflective polarizing film of the present invention has high polarization performance comparable to that of an absorption-type polarizing plate, despite that the reflective polarizing film includes a uniaxially stretched multilayered film. The present invention can thus provide a multilayered reflective polarizing film preferred as a polarizing plate attached to a liquid crystal cell, and an optical member for liquid crystal display devices, and a liquid crystal display device formed from such a multilayered reflective polarizing film.

DESCRIPTION OF REFERENCE NUMERALS AND SIGNS

Figure 1:
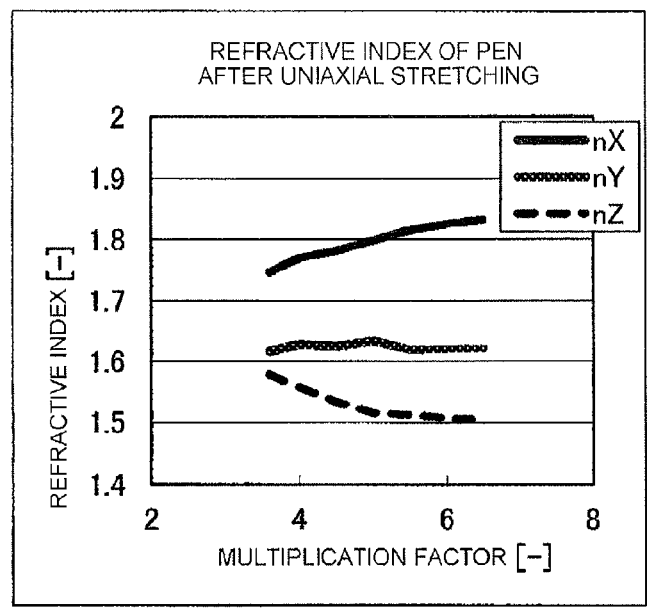
FIG. 1 represents the refractive indices ($n_X$, $n_Y$, and $n_Z$) of 2,6-PEN in the stretch direction (X direction), the direction (Y direction) orthogonal to the stretch direction, and the thickness direction (Z direction), respectively, after uniaxial stretching.

1 Second polarizing plate
2 Liquid crystal cell
3 First polarizing plate

4 Light source
5 Liquid crystal panel

BEST MODE FOR CARRYING OUT THE INVENTION

The present invention is described below in detail.
[Reflective Polarizing Film]
The reflective polarizing film of the present invention is a film that includes a specific uniaxially stretched multilayered film (described below) having a multilayer structure of at least 251 layers of alternately laminated first layers and second layers, and that has an angle of orientation of 2 degrees or less.
[Uniaxially Stretched Multilayered Film]
The uniaxially stretched multilayered film of the present invention is a uniaxially stretched film having a multilayer structure of at least 251 layers of alternately laminated first layers and second layers. In the present invention, the first layer represents a layer having a higher refractive index than the second layer, and the second layer represents a layer having a lower refractive index than the first layer. The refractive indices along the stretch direction (X direction), the direction (Y direction) orthogonal to the stretch direction, and the direction (Z direction) along the film thickness may be represented by $n_X$, $n_Y$, and $n_Z$, respectively.

In the uniaxially stretched multilayered film used in the present invention, a high-refractive-index aromatic polyester having a specific copolymer component is used as the first layer, and an optically isotropic polyester having an average refractive index of 1.50 to 1.60 and that undergoes small refractive index changes after stretching is used as the second layer.

With the first layer formed by using the specific polyester to be described later, the difference between the refractive indices along the X and Y directions of the first layer can be increased after stretching, and the refractive index difference between the first layer and the second layer can be decreased along the Y direction and the Z direction. This makes it possible to greatly improve polarization performance, and improve the hue shift in the transmitted polarized light with respect to the obliquely incident light, as compared with a uniaxially stretched multilayered film in which a polyethylene-2,6-naphthalene dicarboxylate homopolymer, or a polyethylene-2,6-naphthalene dicarboxylate copolymer using common copolymer components such as isophthalic acid and terephthalic acid is used as the first layer.

(First Layer)
The first layer of the present invention is formed of an aromatic polyester (hereinafter, also referred to as "aromatic polyester (I)") that includes copolymer components of specific structures as dicarboxylic acid components. The aromatic polyester is obtained by the polycondensation of the dicarboxylic acid components and the diol component described below.

<Dicarboxylic Acid Components>
The dicarboxylic acid components (i) forming the aromatic polyester (I) of the present invention are at least two aromatic dicarboxylic acid components that include 5 mol % to 50 mol % of the component represented by the following formula (A), and 50 mol % to 95 mol % of the component represented by the following formula (B). Here, the content of each aromatic dicarboxylic acid component is with respect to the total number of moles of the dicarboxylic acid components.

[Chemical Formula 4]

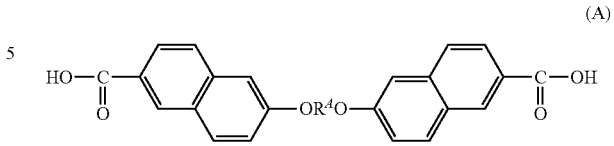

(A)

(In the formula (A), $R^A$ represents an alkylene group of 2 to 4 carbon atoms.)

[Chemical Formula 5]

(B)

(In the formula (B), $R^B$ represents a naphthalenediyl group.)

In the component represented by formula (A), $R^A$ is an alkylene group of 2 to 4 carbon atoms. Examples of the alkylene group include an ethylene group, a trimethylene group, an isopropylene group, and a tetramethylene group, of which an ethylene group is particularly preferred.

The lower limit content of the component represented by formula (A) is more preferably 7 mol %, further preferably 10 mol %, particularly preferably 15 mol %. The upper limit content of the component represented by formula (A) is more preferably 45 mol %, further preferably 40 mol %, particularly preferably 35 mol %, most preferably 30 mol %.

The content of the component represented by formula (A) is thus more preferably 5 mol % to 45 mol %, further preferably 7 mol % to 40 mol %, particularly preferably 10 mol % to 35 mol %, most preferably 15 mol % to 30 mol %.

Preferred as the component represented by formula (A) are components derived from 6,6'-(ethylenedioxy)di-2-naphthoic acid, 6,6'-(trimethylenedioxy)di-2-naphthoic acid, and 6,6'-(butylenedioxy)di-2-naphthoic acid. Of these components, those having an even number of carbon atoms in $R^A$ in formula (A) are preferred, and components derived from 6,6'-(ethylenedioxy)di-2-naphthoic acid are particularly preferred.

The aromatic polyester (I) contains a specific amount of the component of formula (A) as the dicarboxylic acid component. When the proportion of the acid component represented by formula (A) is less than the lower limit, the refractive index in the Y direction does not easily decrease by the uniaxial stretch, and the difference between the refractive index $n_Y$ in the Y direction and the refractive index $n_Z$ in the Z direction increases in the stretched film. This lowers polarization performance, and causes a hue shift in the polarized light incident from oblique angle direction. When the proportion of the component represented by formula (A) exceeds the upper limit, the amorphous properties predominate, and the difference between the refractive index $n_X$ in the X direction and the refractive index $n_Y$ in the Y direction decreases in the stretched film. In this case, the reflective polarizing film fails to exhibit sufficient reflection performance.

With the polyester containing the component represented by formula (A), a uniaxially stretched multilayered film can be obtained that has higher polarization performance than conventional reflective polarizing films, and the hue shift in the obliquely incident polarized light can be suppressed.

In the acid component represented by formula (B), $R^B$ is a naphthalenediyl group.

Examples of the component represented by formula (B) include 2,6-naphthalene dicarboxylic acid, 2,7-naphthalene dicarboxylic acid, components derived from a combination of these components, and derivative components of these. Preferred examples include 2,6-naphthalene dicarboxylic acid, and derivative components thereof.

The lower limit content of the component represented by formula (B) is more preferably 55 mol %, further preferably 60 mol %, particularly preferably 65 mol %, most preferably 70 mol %. The upper limit content of the component represented by formula (B) is more preferably 93 mol %, further preferably 90 mol %, particularly preferably 85 mol %.

The content of the component represented by formula (B) is thus more preferably 55 mol % to 95 mol %, further preferably 60 mol % to 93 mol %, particularly preferably 65 mol % to 90 mol %, most preferably 70 mol % to 85 mol %.

When the proportion of the component represented by formula (B) is less than the lower limit, the amorphous properties predominate, and the difference between the refractive index $n_X$ in the X direction and the refractive index $n_Y$ in the Y direction decreases in the stretched film. In this case, the reflective polarizing film fails to exhibit sufficient performance. When the proportion of the component represented by formula (B) exceeds the upper limit, the difference between the refractive index $n_Y$ in the Y direction and the refractive index $n_Z$ in the Z direction increases in the stretched film, because of the relatively smaller proportion of the component represented by formula (A). This lowers polarization performance, and causes a hue shift in the polarized light incident from oblique angle direction.

With the polyester containing the component represented by formula (B), it is possible to realize birefringence characteristics that show high refractive index along the X direction while maintaining high uniaxial orientation at the same time.

<Diol Component>

The diol component (ii) forming the aromatic polyester (I) of the present invention is 90 mol % to 100 mol % of a diol component represented by the formula (C) below. Here, the content of the diol component is with respect to the total number of moles of the diol component.

[Chemical Formula 6]

$$\text{H—O—R}^C\text{—O—H} \qquad (C)$$

(In the formula (C), $R^C$ represents an alkylene group of 2 to 4 carbon atoms.)

The content of the diol component represented by formula (C) is more preferably 95 mol % to 100 mol %, further preferably 98 mol % to 100 mol %.

In the formula (C), $R^C$ is an alkylene group of 2 to 4 carbon atoms. Examples of the alkylene group include an ethylene group, a propylene group, an isopropylene group, and a tetramethylene group. Preferred as the diol component represented by formula (C) are components derived from ethylene glycol, trimethylene glycol, and tetramethylene glycol, particularly preferably components derived from ethylene glycol. The uniaxial orientation may be lost when the proportion of the diol component represented by formula (C) is less than the lower limit.

<Aromatic Polyester (I)>

The content of the ester unit (-(A)-(C)—) formed by the acid component represented by formula (A) and the diol component represented by formula (C) in the aromatic polyester (I) is 5 mol % to 50 mol %, preferably 5 mol % to 45 mol %, further preferably 10 mol % to 40 mol % of the all repeating units.

Examples of other ester units forming the aromatic polyester (I) include alkylene-2,6-naphthalene dicarboxylate units such as ethylene-2,6-naphthalene dicarboxylate, trimethylene-2,6-naphthalene dicarboxylate, and butylene-2,6-naphthalene dicarboxylate. Of these, the ethylene-2,6-naphthalene dicarboxylate unit is preferred from the standpoint of properties such as high refractive index.

The increased refractive index in the X direction after stretching is mostly affected by the aromatic component represented by formula (A), and the component represented by formula (B). The decreased refractive index in the Y direction after stretching is mostly affected by the component represented by formula (A). Because of the molecular structure containing two aromatic rings joined to each other by ether bonding via an alkylene chain, the aromatic rings easily rotate in directions other than the plane direction upon being uniaxially stretched, and develop refractive index characteristics in the Y direction of the first layer.

On the other hand, the diol component in the aromatic polyester (I) of the present invention is an aliphatic component, and has less effect on the refractive index characteristics of the first layer compared to the dicarboxylic acid component.

The aromatic polyester (I) has an inherent viscosity of 0.4 to 3 dl/g, further preferably 0.4 to 1.5 dl/g, particularly preferably 0.5 to 1.2 dl/g as measured at 35° C. with a mixed solvent of P-chlorophenol/1,1,2,2-tetrachloroethane (weight ratio 40/60).

The melting point of the aromatic polyester (I) ranges from preferably 200 to 260° C., more preferably 205 to 255° C., further preferably 210 to 250° C. The melting point can be measured by DSC.

When the melting point of the polyester exceeds the upper limits, there are cases where the desired fluidity for the melting, extrusion, and molding may not be obtained, and the polyester may fail to uniformly discharge. On the other hand, when the melting point is less than the lower limits, the mechanical or other properties of the polyester tend to be lost, and it becomes difficult to develop the refractive index characteristics of the present invention, though ease of deposition becomes desirable.

As a rule, copolymers have lower melting points than homopolymers, and tend to have lower mechanical strength. However, the polyester of the present invention is a copolymer containing the component of formula (A) and the component of formula (B), and, despite being a copolymer, has excellent properties with the mechanical strength comparable to a homopolymer containing only the component of formula (A), even though the melting point is lower.

The glass transition point (hereinafter, also referred to as "Tg") of the aromatic polyester (I) is preferably 60 to 120° C., more preferably 80 to 118° C., further preferably 85 to 118° C. A film having excellent heat resistance and dimensional stability can be obtained in these Tg ranges. The melting point and the glass transition point can be adjusted according to such factors as the type and the amount of the copolymer component, and by controlling the by-product dialkylene glycol.

The aromatic polyester (I) can be produced, for example, according to the method described in page 9 of WO2008/153188.

(Refractive Index Characteristics of First Layer)

Figure 2:
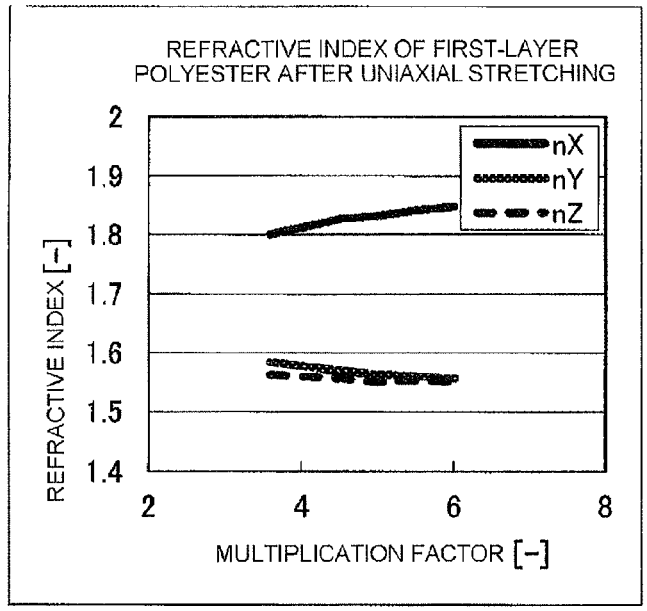
FIG. 2 represents the refractive indices ($n_X$, $n_Y$, and $n_Z$) of a first-layer aromatic polyester (I) of the present invention in the stretch direction (X direction), the direction (Y direction) orthogonal to the stretch direction, and the thickness direction (Z direction), respectively, after uniaxial stretching.
Figure 3:
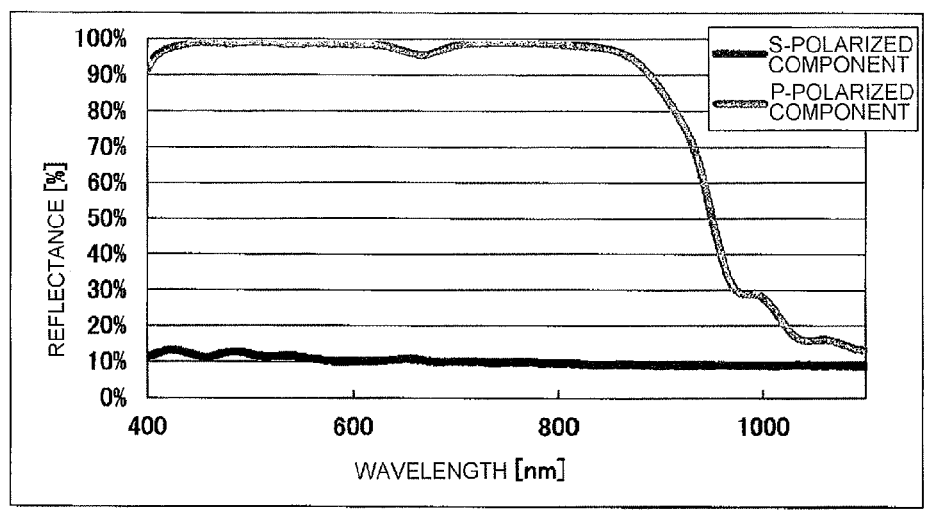
FIG. 3 is an example of a graph of reflectance versus wavelength for a polarized component (p-polarized component) parallel to the incident plane that includes the stretch direction (X direction), and a polarized component (s-polarized component) perpendicular to the incident plane that includes the stretch direction (X direction) in a uniaxially stretched multilayered film of the present invention reflecting light at the film surface.

FIG. 2 represents an example of how refractive index varies in each direction of the uniaxially stretched aromatic polyester (I). As shown in FIG. 2, the refractive index $n_X$ in the X direction increases after stretching, whereas the refractive indices $n_Y$ and $n_Z$ in the Y and Z directions decrease as the film is stretched. The difference between the refractive indices $n_Y$ and $n_Z$ remains very small irrespective of the stretch rate.

Because the first layer is configured from the aromatic polyester (I) containing the specific copolymer components, the first layer has high refractive index characteristics with the refractive index $n_X$ of 1.70 to 1.90 in the X direction after uniaxial stretching. With this range of the refractive index $n_X$ of the first layer, the refractive index difference from the second layer can be increased, and sufficient reflective polarization performance can be obtained.

The difference between the refractive index $n_Y$ and the refractive index $n_Z$ in the Y direction and Z direction after uniaxial stretching is preferably 0.05 or less, further preferably 0.03 or less, particularly preferably 0.01 or less. With the very small refractive index difference between these two directions, a hue shift does not occur even in polarized light incident from oblique angle direction.

On the other hand, when the polyester forming the first layer is polyethylene-2,6-naphthalene dicarboxylate, the refractive index $n_Z$ in the Z direction decreases as the rate of uniaxial stretching increases, whereas the refractive index $n_1$ in the Y direction remains constant irrespective of the rate of uniaxial stretching, as shown in FIG. 1. Accordingly, the difference between the refractive index $n_Y$ and the refractive index $n_Z$ in the Y direction and Z direction becomes large, and a hue shift is likely to occur in polarized light incident from oblique angle direction.

(Second Layer)

In the present invention, the second layer of the uniaxially stretched multilayered film is formed of an optically isotropic polyester having an average refractive index of 1.50 to 1.60. As used herein, average refractive index is defined as the mean value of the refractive indices measured with a prism coupler (Metricon) at 633 nm wavelength in the X, Y, and Z directions of a film obtained by depositing an unstretched film produced by die extrusion of the polyester of the second layer after melting the polyester alone. Here, the film is deposited under the same deposition conditions used for the multilayer stretch film. By being "optically isotropic", it means that the refractive index difference between any two of the X, Y, and Z directions is 0.05 or less, preferably 0.03 or less.

The average refractive index of the polyester forming the second layer is preferably 1.53 to 1.60, further preferably 1.55 to 1.60, further preferably 1.58 to 1.60. With the second layer being an optically isotropic material having a small refractive index difference between different directions after stretching and the average refractive index contained in these ranges, the difference between the refractive indices $n_X$ between the first layer and the second layer can increase after stretching, and high polarization performance can be obtained. At the same time, the refractive index characteristics can be obtained in which the refractive index differences in the Y direction and the Z direction between the first layer and the second layer are very small, making it possible to satisfy both polarization performance and the hue shift due to oblique incident angle.

<Second Layer Component I>

From the viewpoints of ease of deposition in uniaxial stretching, and the refractive index difference from the first layer, the polyester having the foregoing refractive index and optically isotropic characteristics is preferably a polyester containing a copolymerized polyester, such as copolymerized polyethylene terephthalate and copolymerized polyethylene naphthalene dicarboxylate, with a copolymer amount of 5 to 50 mol %, preferably 10 to 40 mol % with respect to the all repeating units of the polyester, more preferably a polyester containing copolymerized polyethylene terephthalate as the main component.

Also preferred is a polyester whose main component is an ethylene terephthalate component obtained by copolymerizing preferably isophthalic acid or 2,6-naphthalene dicarboxylic acid as the copolymer component of the copolymerized polyester, particularly preferably a copolymerized polyester whose main component is an ethylene terephthalate component obtained by copolymerizing isophthalic acid or 2,6-naphthalene dicarboxylic acid, and that has a melting point of 220° C. or less or does not have a melting point. When containing other copolymer components, the amounts of these copolymer components are preferably 10 mol % or less.

The aromatic polyester (I) used for the first layer of the present invention may be used when using copolymerized polyethylene naphthalene dicarboxylate. In this case, it is preferable to use the polyester as a mixture with other copolymerized polyester, in order to obtain the refractive index characteristics of the second layer of the present invention. Preferably, such other copolymerized polyester is a copolymerized polyalkylene terephthalate having a lower refractive index than the foregoing copolymerized polyethylene terephthalate. Examples of copolymer components that form such copolymerized polyalkylene terephthalate of a lower refractive index include alicyclic dicarboxylic acid components such as cyclohexane dicarboxylic acid, decalin dicarboxylic acid, and tetralin dicarboxylic acid; and alicyclic diol components such as cyclohexane dimethanol, adamantanediol, spiroglycol, and tricyclodecane dimethanol.

The polyester forming the second layer may be, for example, an ester exchange product obtained by melting and kneading two or more polyesters during film formation.

<Second Layer Component II>

From the viewpoint of improving heat-resisting dimensional stability, it is preferable that the second layer of the uniaxially stretched multilayered film is formed from a copolymerized polyester having a glass transition point of 80° C. or more with a copolymer amount of 5 mol % to 85 mol %, from among the second-layer polyesters having the foregoing refractive index and optically isotropic characteristics. The glass transition point of the copolymerized polyester is preferably 90° C. to 155° C., further preferably 90° C. to 120° C.

When the glass transition point of the second-layer polyester is less than the lower limit, the rate of thermal shrinkage after stretching cannot be suppressed, which may lead to poor polarization performance when contraction occurs during continuous use as a display. The second-layer polyester should thus preferably have as high a glass transition point as possible within the foregoing range. On the other hand, when the glass transition point is too high, birefringence may occur also in the second-layer polyester upon stretch. In this case, the refractive index difference from the first layer may become smaller in the stretch direction, and reflection performance may suffer.

As to the heat-resisting dimensional stability, the heat-resisting dimensional stability of the second layer itself can be improved when the copolymerized polyester having a glass transition point in the foregoing rage is used for the second layer. Further, because the polymer on the side of the high-refractive-index layer has a low stress characteristic against stretching, it is possible to obtain a multilayer uniaxially stretched film of high reflecting polarization characteristics having a high heat-resisting dimensional stability of 1.5% or less in both the uniaxial stretching direction (X direction) and the direction (Y direction) orthogonal to the X direction as measured under 85° C., 30 min heating conditions.

In the embodiment as the second layer component II, the copolymer amount of the second-layer copolymerized polyester is the proportion of the secondary copolymer component with respect to the 100 mol % repeating units of the second-layer polyester. The amount of the secondary component is the total amount of the components except for the component contained in the highest proportion in the diol component, and the component contained in the highest proportion in the dicarboxylic acid component. For example, in the case of the copolymerized polyester CHDC35SPG70PEN in Table 5 of Examples of the present invention, the copolymer contains 35 mol % of cyclohexane dicarboxylic acid and 65 mol % of a naphthalene dicarboxylic acid component with respect to 100 mol % of the dicarboxylic acid component, and contains 70 mol % of spiroglycol and 30 mol % of ethylene glycol with respect to 100 mol % of the diol component. The copolymer amount is the total 65 mol % of the secondary component cyclohexane dicarboxylic acid contained in 35 mol % in the dicarboxylic acid component, and the secondary component ethylene glycol contained in 30 mol % in the diol component.

From the viewpoints of ease of deposition in uniaxial stretching, and the refractive index difference from the first layer, the copolymerized polyester having the foregoing glass transition point and the refractive index and optically isotropic characteristics is preferably, for example, a copolymerized polyester, such as copolymerized polyethylene terephthalate and copolymerized polyethylene naphthalene dicarboxylate, with a copolymer amount of 5 to 85 mol %, preferably 10 to 70 mol % with respect to the all repeating units of the second-layer polyester.

Because of high rigidity, the aromatic component is often introduced to improve the glass transition point of the polyester. However, introducing such a component often increases the refractive index with the improvement of the glass transition point. It is therefore preferable in the present invention to introduce an alicyclic component such as alicyclic dicarboxylic acid, and alicyclic diol as a copolymer component.

Preferably, the copolymerized polyethylene terephthalate is a copolymerized polyethylene terephthalate that contains alicyclic diol as a copolymer component. By replacing some of the ethylene glycol with alicyclic diol without reducing the aromatic group amount derived from the terephthalic acid, the refractive index characteristics of the present invention can be obtained while having a glass transition point in the foregoing range. Preferably, at least one selected from the group consisting of spiroglycol, tricyclodecane dimethanol, and cyclohexane dimethanol is used as the alicyclic diol.

The copolymerized polyethylene naphthalene dicarboxylate is preferably copolymerized polyethylene naphthalate that contains at least one of alicyclic dicarboxylic acid and alicyclic diol as a copolymer component. The glass transition point of the foregoing range can be provided with the copolymerized polyethylene naphthalene dicarboxylate containing such a copolymer component. Preferably, the copolymer component is at least one selected from the group consisting of cyclohexane dicarboxylic acid, decahydronaphthalene dicarboxylic acid, spiroglycol, tricyclodecane dimethanol, and cyclohexane dimethanol. Examples of the spiroglycol component include 3,9-bis(2-hydroxy-1,1-dimethylethyl)-2,4,8,10-tetraoxaspiro[6,5]undecane.

The copolymerized polyester used for the second layer may be one obtained by the polycondensation of the monomeric copolymer components after ester exchange reaction or esterification reaction, or may be a polyester obtained by mixing more than one polyester.

(Refractive Index Characteristics Between First Layer and Second Layer)

The X-direction refractive index difference between the first layer and the second layer is 0.10 to 0.45, preferably 0.20 to 0.40, further preferably 0.25 to 0.30. With the X-direction refractive index difference falling in these ranges, the reflection characteristic can be improved efficiently, and higher reflectance can be obtained with fewer layers.

The Y-direction refractive index difference between the first layer and the second layer, and the Z-direction refractive index difference between the first layer and the second layer are 0.05 or less. With this range of the Y- and Z-direction refractive index differences between the layers, it is possible to suppress the hue shift caused when the polarized light is incident from oblique angle direction.

(Number of Layers)

The uniaxially stretched multilayered film of the present invention is a laminate of a total of at least 251 alternately laminated first layers and second layers. With this number of layers, constant and high average reflectance can be obtained over the wavelengths of 400 to 800 nm for the average reflectance characteristics of the polarized light component parallel to the incident plane including the stretch direction.

The number of layers is not particularly limited, as long as it falls in the foregoing range. However, the number of layers is preferably 301 layer or more, more preferably 401 layers or more, further preferably 501 layers or more, because higher reflectance can be obtained for the polarized light parallel to the reflection axis as the number of layers is increased.

In a preferred method for obtaining a multilayered stretch film having at least 501 layers, a melt of 300 or less layers is obtained in the alternately laminated state, and the laminate with the maintained layer configuration is divided in a 1:1 ratio in a direction perpendicular to the laminate direction. The layers are then laminated again in units of blocks of the alternately laminated layers so as to increase (double) the number of layers as blocks by a factor of 2 to 4.

The upper limit of the number of layers is limited to 2,001 layers from the standpoint of productivity and handling of the film. Considering productivity and handling of the film, the upper limit of the number of layers may be below this limit, for example, 1,001 layers or 901 layers, provided that the average reflectance characteristics of the present invention are obtained.

(Uniaxially Stretched Film)

The uniaxially stretched multilayered film of the present invention is stretched in at least one axial direction to satisfy the optical properties desired for the reflective polarizing film. The uniaxially stretched film of the present invention includes a film stretched only in one axial direction, and a film stretched in two axial directions, with more stretch in one direction. The uniaxial stretch direction (X direction) may be the longitudinal direction or the width direction of the film, and is preferably the width direction, because it makes it easier to control the angle of orientation. In the case of a film stretched in two axial directions with more stretch in one direction, the more stretched direction (X direction) may be the longitudinal direction or the width direction of the film, and the direction with the lower stretch rate is preferably stretched only about 1.05 to 1.20 times from the standpoint of improving polarization performance. In the case of a film stretched in two axial directions with more stretch in one direction, the term "stretch direction" used in conjunction with polarized light and refractive index refers to the direction with more stretch.

Known stretching methods such as heat stretching using a rod-like heater, roller heat stretching, or tenter stretching may be used for stretching. Tenter stretching is preferred from the viewpoints of reducing scratch due to contact with the roller, and the stretch speed.

(Angle of Orientation of Reflective Polarizing Film)

The reflective polarizing film of the present invention has an angle of orientation of 2 degrees or less, preferably 1 or less As used herein, the angle of orientation represents the extent of the tilt of the in-plane principal orientation axis of the reflective polarizing film with respect to the width direction of the film and the angle of orientation measured at a central portion of each measurement sample cut in 10-cm intervals along the film machine direction (also referred to as film continuous machine direction, longitudinal direction, perpendicular direction, or MD direction) is 2 degrees or less at maximum among these measurements. Preferably, the angle of orientation should be as small as possible in the foregoing range. With the angle of orientation of the reflective polarizing film of the present invention falling in the foregoing range, the polarization performance can be improved to the levels comparable to that offered by the absorption-type polarizing plate. Specifically, by controlling the angle of orientation of the reflective polarizing film of the composition and the layer configuration of the present invention within the foregoing range, the orthogonal axis can highly match the upper polarizing plate in liquid crystal unit production, and high polarization performance can be realized.

The polarization axes cannot be sufficiently uniform when the reflective polarizing film has an angle of orientation above the upper limit, and the polarization performance cannot be increased to the levels comparable to that offered by the absorption-type polarizing plate.

The angle of orientation is mainly affected by the orientation state of the birefringent first-layer polymer, and the foregoing orientation angle range can be realized by controlling the type of the polymer used for the first layer, and the stretch conditions of the uniaxially stretched multilayered film.

(Outermost Layer)

<Outermost Layer I>

Preferably, the uniaxially stretched multilayered film of the present invention has an outermost layer I on at least one of the surfaces, and the retardation (Ra) of the outermost layer I as represented by the following formula (1) is 0 nm or more and less than 20 nm, $$\text{retardation}(Re) = |nTD - nMD| \times 1000 \times d \quad (1)$$

(In the formula (1), nMD and nTD represent the refractive indices in the machine direction and the width direction, respectively, of the outermost layer, and d represents the thickness (μm) of the outermost layer), and the outermost layer I preferably has a thickness of 2 μm to 10 μm.

As used herein, machine direction has the same meaning as the MD direction, the continuous machine direction, and the perpendicular direction. The width direction has the same meaning as the TD direction, and the horizontal direction.

In the present invention, for the purpose of providing a uniform thickness for each layer of the laminate structure of the uniaxially stretched multilayered film, a thick layer that has no effect on optical interference is provided on at least one of the surfaces of the laminate structure. Such a layer is also referred to as a thickness adjusting layer, or an additional layer.

When such a thick layer having no effect on optical interference is used as the outermost layer of the laminate structure in the polarizing plate attached to the liquid crystal cell, it was found that the retardation characteristics of the outermost layer have effect on polarization performance, and affect the degree of polarization as the reflective polarizing plate in some cases. It was found that the effect on polarization performance can be eliminated by controlling the retardation of the outermost layer within a certain range in the embodiment as the outermost layer I. In the embodiment as the outermost layer I, the outermost layer can preferably used for the reflective polarizing plate of an IPS mode liquid crystal display in particular.

When the retardation characteristics of the outermost layer I exceed the upper limit, the polarization performance by the uniaxially stretched multilayered film may be adversely affected, and the percentage improvement of the brightness in the forward direction may be lowered. When the thickness of the outermost layer I is below the lower limit, the outermost layer of the uniaxially stretched multilayered film may fail to sufficiently develop its function to provide a uniform thickness for each layer of the multilayer structure. Increasing the thickness of the outermost layer I above the upper limit does not make the thickness of each layer more uniform.

The lower limit of the retardation of the outermost layer I is preferably 3 nm, further preferably 5 nm. The upper limit of the retardation of the outermost layer I is preferably 18 nm.

The upper limit of the thickness of the outermost layer I is preferably 7 μm or less, further preferably 5 μm or less. When the uniaxially stretched multilayered film has the outermost layer I on the both surfaces, it is preferable that each layer satisfies the foregoing thickness ranges.

The outermost layer I is not particularly limited, as long as it is a thermoplastic resin that satisfies the foregoing retardation characteristics. Preferably, the outermost layer I is produced by being uniaxially stretched with the multilayered film, and uses an amorphous thermoplastic resin, or a low crystalline thermoplastic resin. When using a low crystalline thermoplastic resin, the crystalline orientation should not exist after the film deposition.

At least one of the resins exemplified for the second layer is preferably used as the resin for the outermost layer I of the present invention, or a composition partially containing the resins used for the second layer may be used.

The retardation characteristics of the outermost layer I can be realized by controlling the thickness, the composition, and the stretch conditions of the outermost layer.

Because of the large thickness, the outermost layer I of the present invention does not contribute to reflection characteristics. On the other hand, because of the potential effect on the transmitted polarized light, it is preferable that additives, for example, such as particles that lower transmittance are preferably not contained in the outermost layer I at all, or contained in only minute amounts, for example, 0.1 weight % or less with respect to the layer weight.

In the embodiment as the outermost layer I, the thickness direction retardation (Rth) of the outermost layer represented by the following formula (2) is preferably 0 nm or more and less than 50 nm.

$$\text{Retardation}(Rth) = ((nMD + nTD)/2 - nZ) \times 1000 \times d \quad (2)$$

(In the formula (2), nMD, nTD, and nZ represent the refractive indices in the machine direction, the width direction, and the thickness direction, respectively, of the outermost layer, and d represents the thickness (μm) of the outermost layer.)

In the embodiment as the outermost layer I, the outermost layer I can improve the viewing angle characteristics and the contrast of a liquid crystal display, particularly in an IPS mode liquid crystal display, and can be preferably used as the reflective polarizing plate of an IPS mode liquid crystal display with the film in-plane direction retardation characteristics and the layer thickness characteristics represented by formula (1), and with the thickness direction retardation characteristics represented by formula (2).

<Outermost Layer II>

In the embodiment as outermost layer II, it is preferable that the uniaxially stretched multilayered film of the present invention has an outermost layer II on at least one of the surfaces, and that the retardation (Re) of the outermost layer II represented by the formula (1) below is 0 nm to 30 nm, and the thickness direction retardation (Rth) represented by the formula (2) below is 50 nm to 350 nm, $$retardation(Re)=|nTD-nMD|\times 1000\times d \quad (1)$$

(In the formula (1), nMD and nTD represent the refractive indices in the machine direction and the width direction, respectively, of the outermost layer, and d represents the thickness (μm) of the outermost layer.)

$$retardation(Rth)=((nMD+nTD)/2-nZ)\times 1000\times d \quad (2)$$

(In the formula (2), nMD, nTD, and nZ represent the refractive indices in the machine direction, the width direction, and the thickness direction, respectively, of the outermost layer, and d represents the thickness (μm) of the outermost layer.), and that the thickness of the outermost layer II is 5 μm to 50 μm.

When the thick layer that has no effect on optical interference is used as the outermost layer of the laminate structure in the polarizing plate attached to the liquid crystal cell, the outermost layer can develop the retardation function, and can provide the reflective polarizing film having the retardation function and the reflection and polarization function with the retardation characteristics represented by formulae (1) and (2) in the embodiment as the outermost layer A liquid crystal panel used for VA mode liquid crystal displays typically uses a retardation plate suited for the VA mode with a pair of polarizing plates and a liquid crystal cell. However, with the reflective polarizing film having the outermost layer according to the embodiment as the outermost layer II of the present invention used for a VA mode liquid crystal display, it is not required to use a retardation plate in combination, and multiple functions, including the retardation function, the reflection and polarization function, and the brightness improving function can be realized with a single member.

The lower limit of the retardation (Re) of the outermost layer in the embodiment as the outermost layer II of the present invention is preferably 3 nm, further preferably 5 nm. The upper limit of the retardation (Re) of the outermost layer II is preferably 25 nm, further preferably 20 nm.

The lower limit of the retardation (Rth) of the outermost layer II is preferably 75 nm, more preferably 100 nm, and the upper limit is preferably 300 nm, more preferably 250 nm.

The upper limit of the thickness of the outermost layer II is preferably 30 μm or less, more preferably 20 μm or less, further preferably 15 μm or less.

When the uniaxially stretched multilayered film has the outermost layer II on the both surfaces, it is preferable that each layer satisfies the foregoing thickness ranges.

When the retardation (Re) of the outermost layer in the embodiment as the outermost layer II of the present invention exceeds the upper limit, the polarization performance of the uniaxially stretched multilayered film may be lowered, and the percentage improvement of the brightness in the forward direction may decrease. When the retardation (Rth) of the outermost layer in the embodiment as the outermost layer II of the present invention is outside of the range defined by the lower limit or the upper limit, the retardation function may not sufficiently develop when the reflective polarizing film of the present invention is used for a VA mode liquid crystal display without a retardation plate.

When the thickness of the outermost layer in the embodiment as the outermost layer II of the present invention is below the lower limit, the outermost layer in the multilayered film may not sufficiently develop the function to provide a uniform thickness for each layer of the multilayer structure, and retardation characteristics suited for the VA mode may not be obtained. The upper limit of the thickness of the outermost layer II is not particularly limited from the standpoint of retardation function. However, increasing the thickness of the outermost layer II above the upper limit does not make the thickness of each layer more uniform, and increases the thickness of the reflective polarizing film itself.

The same resins used in the embodiment as the outermost layer I may be used in the embodiment as the outermost layer II of the present invention.

The retardation characteristics of the outermost layer in the embodiment as the outermost layer II can be achieved by controlling the thickness, the composition, and the stretch conditions of the outermost layer. For example, when using the same resin used in the embodiment as the outermost layer I, the retardation characteristics of the outermost layer in the embodiment as the outermost layer II can be obtained by increasing the thickness of the outermost layer, or by controlling the stretch conditions.

With the outermost layer having the retardation characteristics and the thickness characteristics according to the embodiment as the outermost layer II, a reflective polarizing film having a high degree of polarization suited for VA mode liquid crystal displays can be obtained, and, because of the function as the retardation plate, the hue shift caused by oblique incident angle can be suppressed, and the viewing angle can be widened.

[Other Configurations of Uniaxially Stretched Multilayered Film]

(Layer Thickness)

The first layer and the second layer each have a thickness of preferably 0.01 μm to 0.5 μm for selective reflection of light by the optical interference between the layers. The thickness of the first layer is preferably 0.01 μm to 0.1 μm, and the thickness of the second layer is preferably 0.01 μm to 0.3 μm. The thickness of each layer can be determined from a photograph taken with a transmission electron microscope.

The uniaxially stretched multilayered film of the present invention has a reflection waveband in the visible to near infrared region, and reflectance characteristics can be obtained efficiently over the visible to near infrared region with the foregoing thickness ranges of the first layer and the second layer.

(Maximum Layer Thickness to Minimum Layer Thickness Ratio)

In the uniaxially stretched multilayered film of the present invention, it is preferable that the maximum layer thickness to minimum layer thickness ratio is 2.0 to 5.0 in the first layer, and 2.0 to 5.0 in the second layer. More preferably, the maximum layer thickness to minimum layer thickness ratio is 2.0 to 4.0, further preferably 2.0 to 3.5, particularly preferably 2.0 to 3.0 for the both layers.

Specifically, the maximum layer thickness to minimum layer thickness ratio is 2.0 to 5.0 for the first layer and the second layer.

For example, in a multilayered stretch film that includes 126 first layers and 125 second layers, the maximum layer thickness of the first layer is the thickness of the thickest layer in the 126 first layers. The minimum layer thickness of the first layer is the thickness of the thinnest layer in the 126 first layers.

Specifically, the layer thickness ratio is represented as the ratio of the maximum layer thickness with respect to the minimum layer thickness. The maximum layer thickness and the minimum layer thickness of the first layer and the second layer can be obtained from photographs taken with a transmission electron microscope.

In the multilayered film, the reflection wavelengths are determined by the refractive index difference between the layers, the number of layers, and the layer thickness, and reflection occurs only in the specific wavelengths when the laminated first and second layers have constant thicknesses. It is therefore preferable to have the maximum layer thickness to minimum layer thickness ratio in the foregoing ranges to uniformly improve reflectance over a wide waveband of 400 to 800 nm for the polarized component parallel to the incident plane including the stretch direction (X direction). When the maximum layer thickness to minimum layer thickness ratio exceeds the upper limit, the reflection band may become too wide, and the reflectance of the polarized component parallel to the incident plane including the stretch direction (X direction) may decrease.

The thicknesses of the first layer and the second layer may vary either stepwise or continuously.

The method used to laminate the multilayered stretch film of the present invention is not particularly limited. For example, a method that uses a multilayer feed block device may be used in which 138 layers of first-layer polyester and 137 layers of second-layer copolymerized polyester are laminated through separated channels to obtain a laminate of alternately laminated first layers and second layers, and in which the channels are continuously variable by a factor of 2.0 to 5.0.

(Average Layer Thickness Ratio of First Layer and Second Layer)

In the uniaxially stretched multilayered film of the present invention, it is preferable that the ratio of the average layer thickness of the second layer to the average layer thickness of the first layer is 1.5 to 5.0. The lower limit of the ratio of the average layer thickness of the second layer with respect to the average layer thickness of the first layer is more preferably 2.0. The upper limit of the ratio of the average layer thickness of the second layer with respect to the average layer thickness of the first layer is more preferably 4.0, further preferably 3.5.

These ranges of the ratio of the average layer thickness of the second layer with respect to the average layer thickness of the first layer are preferred from the standpoint of optical properties, because, in these ranges, the secondary reflection that occurs at half wavelength of the reflection wavelength can be used effectively, and the maximum layer thickness to minimum layer thickness ratio can be minimized in the first layer and the second layer. Further, by varying the thickness ratio of the first layer and the second layer, it is possible to adjust the mechanical properties of the product film with the maintained adhesion between the layers and without changing the resin to be used, and the film is less likely to tear.

On the other hand, when the ratio of the average layer thickness of the second layer to the average layer thickness of the first layer falls outside of the foregoing ranges, the secondary reflection that occurs at half wavelength of the reflection wavelength may become smaller and lower reflectance.

(Film Thickness)

The thickness of the uniaxially stretched multilayered film of the present invention is preferably 15 μm to 150 μm, more preferably 25 μm to 120 μm.

(Average Reflectance)

In the reflective polarizing film that includes the uniaxially stretched multilayered film of the present invention, the average reflectance at 400 to 800 nm wavelengths for the polarized light incident at 0 degree angle and reflected at the film surface is preferably 95% or more with regard to the polarized component parallel to the incident plane that includes the uniaxial stretch direction (X direction), and the average reflectance at 400 to 800 nm wavelengths for the polarized light incident at 0 degree angle and reflected at the film surface is preferably 12% or less with regard to the polarized component perpendicular to the incident plane that includes the X direction. The average reflectance for the polarized light incident at 50 degree incident angle preferably has the same characteristics as the 0 degree average reflectance for each component.

As used herein, "incident plane" refers to the plane perpendicular to the reflecting surface, and that includes incident rays and reflected rays. When the film surface is the reflecting surface, the polarized component parallel to the incident plane that includes the stretch direction (X direction) of the uniaxially stretched film may be referred to as p-polarized light, polarized light orthogonal to the transmission axis, polarized light along the extinction axis direction, or polarized light along the reflection axis direction in the present invention. When the film surface is the reflecting surface, the polarized component perpendicular to the incident plane that includes the stretch direction (X direction) of the uniaxially stretched film may be referred to as s-polarized light, or polarized light along the transmission axis direction in the present invention. Further, "incident angle" means incident angle with respect to the direction perpendicular to the film surface.

The average reflectance at 400 to 800 nm wavelengths for the polarized light incident at 0 degree angle and reflected at the film surface is further preferably 98% to 100% with regard to the polarized component parallel to the incident plane that includes the stretch direction (X direction) of the uniaxially stretched film. Because of the high average reflectance for the p-polarized component, the quantity of the transmitted p-polarized light can be reduced, and high polarization performance selectively passing s-polarized light can develop, making it possible to obtain high polarization performance comparable to that offered by conventional absorption-type polarizing plates. At the same time, because the p-polarized light in the direction orthogonal to the transmission axis is not absorbed but highly reflected, the film can also serve as a brightness enhancement film that reuses the reflected light.

The average reflectance at 400 to 800 nm wavelengths for the polarized light incident at 50 degree angle and reflected at the film surface is further preferably 96% to 99% with regard to the polarized component parallel to the incident plane that includes the stretch direction (X direction) of the uniaxially stretched film. Because of the high average reflectance for the p-polarized light at 50 degree incident angle, high polarization performance can be obtained, and the passage of obliquely incident light can be highly suppressed to suppress a hue shift due to such light.

The average reflectance at 400 to 800 nm wavelengths for the polarized light incident at 0 degree angle and reflected at the film surface is further preferably 5% to 12%, particularly preferably 8% to 12% with regard to the polarized component perpendicular to the incident plane that includes the stretch direction (X direction) of the uniaxially stretched film. The average reflectance at 400 to 800 nm wavelengths for the polarized light incident at 50 degree angle and reflected at the film surface is further preferably 5% to 10%, particularly preferably 8% to 10% with regard to the polarized component perpendicular to the incident plane that includes the stretch direction (X direction) of the uniaxially stretched film.

The quantity of the s-polarized light that emerges from the opposite side from the light source increases when the average reflectance at 400 to 800 nm wavelengths for the s-polarized component incident in perpendicular direction and oblique direction is confined in these ranges. On the other hand, when the average reflectance for the s-polarized component exceeds the upper limit, the polarization transmittance as the reflective polarizing film decreases, and the performance as the polarizing plate attached to the liquid crystal cell may not develop sufficiently. On the other hand, the transmittance for the s-polarized component increases as the reflectance for the polarized light decreases in the foregoing ranges. However, lowering the reflectance below the lower limit is not always easy for reasons related to composition and stretching.

In the uniaxially stretched multilayered film configured from the alternately laminated first layers and second layers, the average reflectance characteristics for the p-polarized component can be obtained by forming each layer with the foregoing polymers, and by increasing the refractive index difference between the first layer and the second layer in the stretch direction (X direction), which is attained by stretching the film in the stretch direction (X direction) at a certain stretch rate and providing birefringence along the in-plane direction of the first layer. Further, the average reflectance in the 400 to 800 nm wavelength region can be obtained by using a method that adjusts each thickness of the first layer and the second layer.

In the uniaxially stretched multilayered film configured from the alternately laminated first layers and second layers, the average reflectance characteristics for the s-polarized component can be obtained by using the foregoing polymers as the polymer components of the layers, and by providing a very small refractive index difference between the first layer and the second layer in the orthogonal direction (Y direction), which is attained by not stretching the film in the direction (Y direction) orthogonal to the stretch direction, or by stretching the film at a low stretch rate. Further, the average reflectance in the 400 to 800 nm wavelength region can be obtained by using a method that adjusts each thickness of the first layer and the second layer.

(Rate of Thermal Shrinkage)

The reflective polarizing film of the present invention has a rate of thermal shrinkage of preferably 1.5% or less, further preferably 1.0% or less as measured at 85° C., 30 min conditions. The rate of thermal shrinkage is the property in both the uniaxial stretch direction and the direction orthogonal thereto.

With the reflection and polarization performance and the high heat-resisting dimensional stability in both the stretch direction and the orthogonal direction, the reflective polarizing film can maintain high polarization performance even after a heat treatment or when used under a high-temperature environment, without shrinking and lowering polarization performance.

In an exemplary method of obtaining the heat-resisting dimensional stability, the aromatic polyester (I) having a low stress characteristic against stretching is used for the high-refractive-index layer (first layer), and the copolymerized polyester having a high glass transition point is used for the low-refractive-index layer (second layer).

(Haze Characteristics)

The reflective polarizing film of the present invention has a haze value of preferably 1.0% or less, more preferably 0.5% or less. With such haze value characteristics, transmittance for S polarized light increases, and a higher degree of polarization can be obtained. These haze values can be obtained when the copolymerized polyester having a glass transition point 80° C. or more is used as the second-layer polyester, and when each layer of the multilayer uniaxially stretch film of the present invention does not contain additives such as a lubricant, or contains additives in 0.1 weight % or less with respect to the layer weight.

[Uniaxially Stretched Multilayered Film Producing Method]

A method for producing the uniaxially stretched multilayered film of the present invention is described below in detail.

The multilayered stretch film of the present invention is produced as a multilayer unstretched film by extruding a laminate of at least 251 layers of alternately laminated first-layer polyester and second-layer polyester in the molten state (sheet producing step). Here, the laminate of at least 251 layers is obtained in a manner that varies the thickness of each layer either stepwise or continuously by a factor of 2.0 to 5.0.

The multilayer unstretched film is stretched in at least one direction (the direction along the film plane), specifically the machine direction, and/or the width direction orthogonal thereto, preferably in the width direction.

The orientation angle characteristic of the present invention can be obtained by stretching the film by a factor of 4 to 7 in the temperature range from the glass transition point (Tg) of the first-layer polyester to Tg+30° C., and by towing out (restretching) the film 5% to 15% in the stretch direction while heat fixing the stretched film in a temperature range of from Tg to Tg+30° C. In this manner, by stretching the film at low temperature, and then towing out the film in the same direction under a lower temperature of heat fixing, a highly controlled orientation characteristic can be obtained.

Known stretching methods such as heat stretching using a rod-like heater, roller heat stretching, or tenter stretching may be used for stretching. Tenter stretching is preferred from the viewpoints of reducing scratch due to contact with the roller, and the stretch speed. When the film is biaxially stretched in the stretch direction and the direction (Y direction) orthogonal thereto, the stretch rate is limited to preferably about 1.05 to 1.20. Polarization performance may suffer when the stretch rate in the Y direction exceeds this range. Preferably, the film is further heat fixed after being stretched.

In a preferred method for obtaining, for example, a uniaxially stretched multilayered film having at least 501 layers in the present invention, a melt of 300 or less layers is obtained in the alternately laminated state, and the laminate with the maintained layer configuration is divided in a 1:1 ratio in a direction perpendicular to the laminate direction. The layers are then laminated again in units of blocks of the alternately laminated layers so as to increase (double) the number of layers as blocks by a factor of 2 to 4. Doubling may be performed by using a known method. The uniaxially stretched multilayered film can be obtained through the stretching step described above after obtaining the multilayer unstretched film by casting the melt onto a cast drum in the laminated state.

[Optical Member for Liquid Crystal Display Device]

Figure 4:
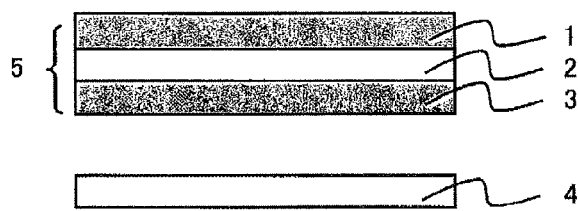
FIG. 4 is a schematic cross sectional view of a liquid crystal display device according to a preferred embodiment of the present invention.

The reflective polarizing film of the present invention has high polarization performance comparable to that of conventional absorption-type polarizing plates, and can be used as at least one of the polarizing plates of the liquid crystal cell. Specifically, the present invention also encompasses a liquid crystal display device optical member in which a first polarizing plate as the reflective polarizing film of the present invention, a liquid crystal cell, and a second polarizing plate are laminated in this order. Such an optical member is also referred to as a liquid crystal panel. FIG. 4 represents an optical member 5, a first polarizing plate 3, a liquid crystal cell 2, and a second polarizing plate 1.

Conventionally, high polarization performance is obtained with at least the absorption-type polarizing plates used as the polarizing plates on the both sides of a liquid crystal cell. The polarizing plate using the multilayered film of the present invention can provide high polarization performance unachievable with the conventional multilayered film, and can be used by being attached to the liquid crystal cell as a replacement of the conventional absorption-type polarizing plate.

Specifically, an advantage of the present invention is that the reflection-type polarizing plate that includes the multilayered film of the present invention can solely be used as at least one of the polarizing plates of the liquid crystal cell, and does not need to be used or laminated with the conventionally required absorption-type polarizing plate.

The liquid crystal cell may be of any type, including VA mode, IPS mode, TN mode, STN mode, and bend orientation (m type).

The reflective polarizing film of the present invention can preferably be used for IPS mode liquid crystal displays in particular when the reflective polarizing film has the outermost layer I as an embodiment of the outermost layer of the present invention, because it does not interfere with the high polarization performance of the uniaxially stretched multilayered film.

The reflective polarizing film of the present invention can preferably be used for VA mode liquid crystal displays when the reflective polarizing film has the outermost layer II as an embodiment of the outermost layer of the present invention, because in this case the reflective polarizing film has the retardation function in addition to the high polarization performance of the uniaxially stretched multilayered film, and does not require a retardation plate.

Specifically, the reflective polarizing film of the present invention can be used as at least one of the polarizing plates of the liquid crystal cell in a VA mode liquid crystal display, and specifically the present invention also encompasses a VA mode liquid crystal display optical member in which a first polarizing plate formed from the reflective polarizing film of the present invention, a liquid crystal cell, and a second polarizing plate are laminated in this order.

The type of the second polarizing plate is not particularly limited, and an absorption-type polarizing plate or a reflection-type polarizing plate may be used. When using a reflection-type polarizing plate as the second polarizing plate, it is preferable to use the reflective polarizing film of the present invention.

In the liquid crystal display device optical member of the present invention, it is preferable to laminate the first polarizing plate, the liquid crystal cell, and the second polarizing plate in this order. These members may be laminated either directly, or via intervening layers, including, for example, a layer, called an adhesive layer or a bonding layer, that improves the adhesion between the layers (hereinafter, also referred to as adhesive layer), and a protective layer.

[Formation of Liquid Crystal Display Device Optical Member]

As the preferred method of disposing the polarizing plate on the liquid crystal cell, the liquid crystal cell and the polarizing plate are laminated with an adhesive layer. The adhesive used to form the adhesive layer is not particularly limited, and may be appropriately selected from, for example, adhesives that use polymers such as acrylic polymer, silicone-based polymer, polyester, polyurethane, polyamide, polyether, fluoropolymer, and rubber polymer as base polymers. Particularly preferred are adhesives such as acrylic adhesives that excel in transparency, and have adhesive properties with moderate wettability, aggregability, and adhesion, in addition to having other desirable properties, including weather resistance and heat resistance. More than one adhesive layer of different compositions or types may be provided.

From the standpoint of the workability of laminating the liquid crystal cell and the polarizing plate, it is preferable to provide the adhesive layer on one of or both of the polarizing plate and the liquid crystal cell in advance. The thickness of the adhesive layer may be appropriately decided according to such factors as intended use and adhesion strength, and is typically 1 to 500 µm, preferably 5 to 200 µm, particularly preferably 10 to 100 µm.

(Release Film)

Preferably, a release film (separator) is temporarily attached to cover the exposed surface of the adhesive layer until use, for example, for the purpose of preventing contamination. The release film can prevent any contact to the adhesive layer during routine handling. The release film may be, for example, a plastic film, a rubber sheet, a paper, a fabric, a nonwoven fabric, a net, a foamed sheet, a metal foil, or a laminate thereof, coated with a remover such as a silicone-based remover, a long-chain alkyl remover, a fluorine-based remover, and molybdenum sulfide, as required.

[Liquid Crystal Display Device]

The present invention also encompasses a liquid crystal display device that includes a light source, and the liquid crystal display device optical member of the present invention, and in which the first polarizing plate is disposed on the side of the light source.

FIG. 4 is a schematic cross sectional view showing a liquid crystal display device as an embodiment of the present invention. The liquid crystal display device includes a light source 4 and a liquid crystal panel 5, and optionally includes components such as a drive circuit installed therein. The liquid crystal panel 5 includes a first polarizing plate 3 on the liquid crystal cell 2 on the side of the light source 4. Further, a second polarizing plate 1 is provided on the side of the liquid crystal cell 2 opposite from the light source, specifically on the viewing side. The liquid crystal cell 2 may be of any type, including VA mode, IPS mode, TN mode, STN mode, and bend orientation ($\pi$ type) as described above, and the mode of the liquid crystal cell may be selected according to the characteristics of the outermost layer.

In the liquid crystal display device of the present invention, the first polarizing plate 3 as the reflective polarizing film of the present invention having high polarization performance is disposed on the liquid crystal cell 2 on the side of the light source. The first polarizing plate 3 can be used by being attached to the liquid crystal cell as a replacement of the conventional absorption-type polarizing plate.

The first polarizing plate as the reflective polarizing film of the present invention has high polarization performance comparable to that of conventional absorption-type polarizing plates, and also serves as a brightness enhancement film to reflect and reuse non-transmitted polarized light. It is therefore not required to additionally provide a reflection-type polarizing plate, or the brightness enhancement film as it is called, between the light source 4 and the first polarizing plate 3, and the function of the brightness enhancement film and the function of the polarizing plate attached to the liquid crystal cell can be integrated to reduce the number of components.

Further, because the liquid crystal display device of the present invention uses the reflective polarizing film of the present invention as the first polarizing plate, the device does not pass almost any obliquely incident p-polarized component, but passes the s-polarized component simultaneously incident in oblique direction while suppressing the reflection in obliquely incident light. This makes it possible to suppress the hue shift of the transmitted light with respect to the obliquely incident light, allowing the colors of the projected image by the liquid crystal display device, as they are, to be viewed.

The second polarizing plate 1 is typically disposed on the viewing side of the liquid crystal cell 2, as shown in FIG. 4. The second polarizing plate 1 is not particularly limited, and, for example, a known absorption-type polarizing plate may be used. When the influence of outside light is very small, the same reflection-type polarizing plate used as the first polarizing plate may be used as the second polarizing plate. Under the influence of outside light, the liquid crystal display device appears mirror-like when not viewed, whereas images are sufficient for viewing. In other words, the liquid crystal display device can have a cosmetically appealing appearance.

Various optical layers, for example, such as an optical compensation film may be provided on the viewing side of the liquid crystal cell 2, in addition to the second polarizing plate. However, the retardation plate may not be provided when the outermost layer in the embodiment as the outermost layer I or II of the present invention is used.

[Formation of Liquid Crystal Display Device]

The liquid crystal display device of the present invention can be obtained by combining the liquid crystal display device optical member (liquid crystal panel) of the present invention with a light source, and, as required, with other components such as a drive circuit. Other components required for the formation of the liquid crystal display device may also be combined. However, it is preferable in the liquid crystal display device of the present invention that the emitted light from the light source be incident on the first polarizing plate.

Broadly, the light source of liquid crystal display devices typically exists as a direct illumination type or a side illumination type. The liquid crystal display device of the present invention is not limited to the specific illumination type, and any type of light source may be used.

The liquid crystal display device obtained as above has various applications, including, for example, OA equipment such as personal computer monitors, laptop personal computers, and copiers; portable devices such as cell phones, watches, digital cameras, personal digital assistance (PDA), and portable gaming machines; home appliances such as video cameras, television, and microwave ovens; in-car products such as back monitors, car navigation system monitors, and car audio; devices for signs and displays, such as information monitors for shops and stores; security equipment such as surveillance monitors; and caring and medical equipment such as monitors for caring, and medical monitors.

EXAMPLES

The present invention is described below using Examples. However, the present invention is not limited by the following Examples.

In the following Examples, physical properties and characteristics are measured or evaluated by using the methods described below.

(1) Refractive Index and Average Refractive Index of Each Layer

The polymer for forming each layer was melted, die extruded, and cast onto a casting drum to produce a film (monolayer film). The film was deposited under the same conditions used for the deposition of the multilayered stretch film to prepare a stretch film. The stretch film was measured for the refractive indices ($n_X$, $n_Y$, and $n_Z$) in the stretch direction (X direction), the direction (Y direction) orthogonal to the stretch direction, and the thickness direction (Z direction), respectively, at 633 nm wavelength, using a prism coupler (Metricon). The mean value of $n_X$, $n_Y$, $n_Z$ was then determined to obtain an average refractive index.

(2) Melting Point (Tm) and Glass Transition Point (Tg) of Polyester and Film 10 mg of a polymer sample or a film sample was used to measure melting point and glass transition point. Measurements were made at a rate of temperature increase of 20° C./min, using DSC (TA Instruments; product name: DSC2920).

(3) Identification of Polyester, and Copolymer Component and Component Amount

Each layer of a film sample was measured by $^1$H-NMR to identify the polyester component, and the copolymer component and component amount.

(4) Reflectance and Reflection Wavelength

A specular reflectance relative to a mirror formed by vapor deposition of aluminum was measured at each wavelength in the 400 nm to 800 nm wavelength range with a polarizing filter installed on the side of the light source, using a spectrophotometer (Shimadzu Corporation, MPC-3100). Here, the measured value for p-polarized light was obtained with the polarizing filter disposed to align the transmission axis with the stretch direction (X direction) of the reflective polarizing film, and the measured value for s-polarized light was obtained with the polarizing filter disposed to make the transmission axis orthogonal to the film stretch direction. The mean value of the measured reflectance values for each polarized component in the 400-800 nm range was obtained as the average reflectance.

For the measurement, a film sample having the outermost layer on the both sides of the uniaxially stretched multilayered film as described in each specific example was used, and light was incident at 0 degree angle from the direction perpendicular to the film surface of the film sample. The reflectance characteristics for 50 degree incident angle were measured by adjusting the film sample position with respect to the light source in a manner allowing the polarized light of interest to be incident at a position tilted 0 to 50 degrees within the incident plane with respect to the 0 degree direction perpendicular to the film surface of the film sample.

(5) Layer Thickness

A film sample was cut to 2 mm in length and 2 cm in width, and embedded in an epoxy resin (Epomount; Refinetec) after being fixed to an embedding capsule. The embedded sample was cut in a direction perpendicular to the width direction using Microtome (ULTRACUT UCT; LEICA) to prepare a 5 nm-thick thin film slice. The sample was observed with a transmission electron microscope (Hitachi S-4300) under the acceleration voltage of 100 kV, and the thickness of the outermost layers, and each layer thickness of the uniaxially stretched multilayered film were measured from the observed image.

The ratio of the maximum layer thickness to the minimum layer thickness was also determined for the first layer and the second layer from the thickness of each layer.

The average layer thickness was determined for the first layer and the second layer from the thickness of each layer, and the average layer thickness of the second layer with respect to the average layer thickness of the first layer was calculated.

Note that the outermost layers were excluded from the first and second layers in the determination of the characteristics related to the thicknesses of the first layer and the second layer. A thickness adjusting layer having a thickness of 2 μm or more was also excluded from the first and second layers when such a thickness adjusting layer was present in the alternately laminated layers.

(6) Total Film Thickness

With a film sample pinched by a spindle detector (K107C; Anritsu), the thickness was measured at 10 different points, and the mean value was determined as the film thickness, using a digital differential electronic micrometer (K351; Anritsu).

(7) Refractive Index of Outermost Layer

A film including the uniaxially stretched multilayered film and the outermost layer was used as a sample, and the refractive index of the outermost layer was measured for each of the machine direction, the width direction, and the film thickness direction, using an abbe refractive index meter, and sodium D line as the light source. Methylene iodide was used as mount solution, and measurement was made in 25° C., 65% RH atmosphere. From the refractive index values so obtained, retardation (Re) and retardation (Rth) were determined according to the formulae (1) and (2) below, respectively. Because the outermost layer had a layer thickness of 2 μm or more, the refractive index of the outermost layer can be directly measured even in the state of being provided on the uniaxially stretched multilayered film.

$$\text{Retardation}(Re) = |nTD - nMD| \times 1000 \times d \quad (1)$$

(In the formula (1), nMD and nTD represent the refractive indices of the outermost layer in the machine direction and the width direction, respectively, and d represents the thickness of the outermost layer (μm).)

$$\text{Retardation}(Rth) = ((nMD + nTD)/2 - nZ) \times 1000 \times d \quad (2)$$

(In the formula (2), nMD, nTD, and nZ represent the refractive indices of the outermost layer in the machine direction, the width direction, and the thickness direction, respectively, and d represents the thickness of the outermost layer (μm).

(8) Orientation Angle Measurement

The orientation state of the reflective polarizing film was observed with a polarizing microscope (Carl Zeiss), and the extent of the tilt of the principal orientation axis direction within the film plane with respect to the film width direction was measured as an angle of orientation.

Specifically, a film sample having a width of 1.5 m was cut at 10-cm intervals into 15 measurement samples along the film machine direction, and the angle of orientation of the measurement sample was measured at the central portion of each sample. The maximum value of the values from these 15 points was then obtained as the maximum angle of orientation.

(9) Brightness Improving Effect, and Hue

A liquid crystal display device as a personal computer display was used, and the front brightness in the screen of the liquid crystal display device displaying white with the personal computer was measured with an FPD viewing angle measurement and evaluation device ErgoScope88 (Opto Design Inc.). In Examples 1 to 7, 13 to 25, and Comparative Examples 2 to 10, and 21 and 22, an increase rate of brightness from Comparative Example 1, and color were calculated, and the brightness improving effect was evaluated according to the criteria described below. The liquid crystal display devices used for the measurements in the Examples and Comparative Examples include the IPS mode liquid crystal cell described in the Production of Liquid Crystal Panel section of Comparative Example 1.

In Examples 8 to 12, 26 and 27, and Comparative Examples 12 to 20, an increase rate of brightness from Comparative Example 11, and color were calculated, and the brightness improving effect was evaluated according to the criteria described below. The liquid crystal display devices used for measurements in the Examples and Comparative Examples include the VA mode liquid crystal cell described in the Production of Liquid Crystal Panel section of Comparative Example 11.

Excellent: brightness improving effect is 160% or more

Good: brightness improving effect is 150% or more and less than 160%

Acceptable: brightness improving effect is 140% or more and less than 150%

Poor: brightness improving effect is less than 140%

Maximum changes in hue x and hue y were evaluated according to the following criteria in the all-around viewing angle of 0 to 80 degrees, by taking the front of the screen as 0 degree.

Excellent: maximum change is less than 0.03 in both x and y

Good: maximum change is less than 0.03 in x or y

Poor: maximum change is 0.03 or more in both x and y

(10) Contrast Evaluation (Degree of Polarization)

A liquid crystal display device as a personal computer display was used, and the front brightness in the screen of the liquid crystal display device displaying white and black with the personal computer was measured with an FPD viewing angle measurement and evaluation device ErgoScope88 (Opto Design Inc.). Light brightness and dark brightness were determined from the white screen and the black screen, respectively, and the contrast determined as light brightness/dark brightness was evaluated according to the following criteria.

The liquid crystal display device used for the contrast evaluation in each Example and Comparative Example is the same liquid crystal display device used for the measurements of brightness improving effect and hue in (9).

Excellent: contrast (light brightness/dark brightness) is 300 or more

Good: contrast (light brightness/dark brightness) is 200 or more and less than 300

Poor: contrast (light brightness/dark brightness) is less than 200

(11) Rate of Thermal Shrinkage

A film sample was marked at 30-cm intervals, and subjected to a heat treatment for 30 min in an 85° C. oven under no load. After the heat treatment, the marked intervals were measured, and the rate of thermal shrinkage was calculated according to the following equation in the uniaxial stretch direction and the direction orthogonal thereto.

Rate of thermal shrinkage(%)=((distance between marks before heat treatment−distance between marks after heat treatment)/distance between marks before heat treatment)×100

(12) Film Haze

A haze measurement device (NDH-2000; Nippon Denshoku Industries Co., Ltd.) was used for measurement according to JIS-K7136.

(13) Durability Evaluation

A liquid crystal display device as a personal computer display was used, and the appearance of the liquid crystal panel taken out of the liquid crystal display device was observed by naked eyes after 3,000 hours of continuous illumination of the backlight. Evaluation was made according to the following criteria.

Evaluation Criteria:

Excellent: No change in film external appearance after the heating

Good: Changes are observed in the film by visual inspection after the heating; unmeasurable irregularities, less than 0.5 mm in height, are present Acceptable: Irregularities, less than 1 mm in height, are present in the film after the heating Poor: Irregularities, 1 mm or more in height, are present in the film after the heating Comparative Example 1

(Polarizer Production)

A polymer film containing polyvinyl alcohol as a main component [Kuraray 9P75R (thickness: 75 μm, average degree of polymerization: 2,400, degree of saponification 99.9 mol %)] was stretched and transported between rollers of different circumferential velocities while being dyed. First, the polyvinyl alcohol film was swelled by being dipped in a 30° C. water bath for 1 min, and stretched 1.2 times in the transport direction. The film was then dipped in a 30° C. aqueous solution of 0.03 weight % potassium iodide and 0.3 weight % iodine for 1 min, and stretched 3 times in the transport direction relative to the unstretched film (original length) while being dyed. Then, the film was dipped in a 60° C. aqueous solution of 4 weight % boric acid and 5 weight % potassium iodide for 30 seconds, and stretched 6 times in the transport direction relative to the original length. The resulting stretch film was then dried at 70° C. for 2 min to obtain a polarizer. The polarizer had a thickness of 30 μm, and the water content of 14.3 weight %.

(Adhesive Production)

50 weight parts of methylol melamine with respect to 100 weight parts of a polyvinyl alcohol resin having an acetoacetyl group (average degree of polymerization 1,200; degree of saponification 98.5% mol %; degree of acetoacetylation 5 mol %) was dissolved in deionized water under 30° C. temperature conditions to prepare an aqueous solution with a solid content of 3.7 weight %. Then, an aqueous solution (18 weight parts) containing a positively charged alumina colloid (average particle diameter 15 nm) in 10 weight % in terms of a solid content was added to 100 weight parts of the aqueous solution to prepare an adhesive aqueous solution. The adhesive solution had a viscosity of 9.6 mPa·s, and a pH of 4 to 4.5. The alumina colloid was mixed in 74 weight parts with respect to 100 weight parts of the polyvinyl alcohol resin.

(Production of Absorption-Type Polarizing Plate)

The alumina colloid-containing adhesive was applied to one surface of an optically isotropic element (Fujitac ZRF80S; Fujifilm) having a thickness of 80 μm, a front retardation of 0.1 nm, and a thickness direction retardation of 1.0 nm. The adhesive was applied to make the dry thickness 80 nm. The film was then laminated on one surface of the polarizer, roller-to-roller, with the transport directions of these elements parallel to each other. Then, another optically isotropic element (Fujitac ZRF803; Fujifilm) was laminated to the other surface of the polarizer roller-to-roller with the transport directions being parallel to each other, after applying the alumina colloid-containing adhesive to one surface of the optically isotropic element in a dry thickness of 80 nm. The polarizer was then dried at 55° C. for 6 min to obtain a polarizing plate, or "polarizing plate X".

(Production of Liquid Crystal Panel)

A liquid crystal panel was removed from a liquid crystal television that included an IPS mode liquid crystal cell and a direct illumination backlight (Viera TH-32LZ80, 2007 model; Matsushita Electronics). The polarizing plate and the optical compensation film disposed on the both sides of the liquid crystal cell were detached, and the glass surfaces on the front and back of the liquid crystal cell were washed. Then, the polarizing plate X was disposed on the light source-side of the liquid crystal cell via the acrylic adhesive along the absorption axis direction of the polarizing plate originally disposed on the light source side of the liquid crystal panel.

Then, the polarizing plate X was disposed on the viewing side of the liquid crystal cell via the acrylic adhesive along the absorption axis direction of the polarizing plate originally disposed on the viewing side of the liquid crystal panel. As a result, a liquid crystal panel was obtained that included the polarizing plates X disposed on the both principal surfaces of the liquid crystal cell.

(Production of Liquid Crystal Display Device)

The liquid crystal panel was assembled into the original liquid crystal display device, and the brightness of the white screen and the black screen displayed with a personal computer under the illumination of the light source of the liquid crystal display device was evaluated.

Example 1

Dimethyl 2,6-naphthalene dicarboxylate, 6,6'-(ethylenedioxy)di-2-naphthoic acid, and ethylene glycol were subjected to esterification reaction and ester exchange reaction in the presence of titanium tetrabutoxide. This was followed by polycondensation reaction to obtain an aromatic polyester that had an inherent viscosity of 0.62 dl/g, and contained the 2,6-naphthalenedicarboxylic acid component (PEN in the table) and the 6,6'-(ethylenedioxy)di-2-naphthoic acid component (ENA in the table) as the acid components in 65 mol and 35 mol %, respectively, and ethylene glycol as the glycol component. The aromatic polyester was used as a first-layer resin, and an isophthalic acid 20 mol % copolymerized polyethylene terephthalate (IA20PET) having an inherent viscosity (ortho-chlorophenol, 35° C.) of 0.62 dl/g was prepared as a second-layer thermoplastic resin.

The first-layer resin and the second-layer resin were dried at 170° C. for 5 hours, and fed to a first and a second extruder. After being heated to 300° C. to melt, the first-layer polyester and the second-layer polyester were separated into 138 layers and 137 layers, respectively, and a laminated melt with the total 275 layers of alternately laminated first layers and second layers was obtained with a multilayer feed block device, which was used to alternately laminate the first layer and the second layer in a manner allowing the maximum layer thickness to minimum layer thickness ratio to continuously vary to 2.2 in the first layer and the second layer. With the maintained laminated state, the same polyester used for the second layer was guided to a three-layer die from a third extruder on the both sides of the melt, and a thickness adjusting layer was further laminated on the both sides of the laminated melt having a total of 275 layers. The feed amount through the third extruder was adjusted to make the thickness adjusting layer 18% of the total. With the maintained laminated state (hereinafter, also referred to as "1 unit"), the layers were divided in a 1:1 ratio in the direction perpendicular to the laminate direction, and laminated again so as to increase (double) the number of layers by a factor of 2. With the maintained laminated state, the layers were guided to a die, and cast onto a casting drum. The average layer thickness ratio of the first layer and the second layer was adjusted to 1.0:2.6. This completed the production of the multilayer unstretched film that included the thickness adjusting layers on the outermost sides as outermost layers.

The multilayer unstretched film was stretched 5.2 times in the width direction at a temperature of 120° C., and heat fixed for 3 seconds while being further stretched 15% in the same direction at 120° C. The resulting reflective polarizing film had a thickness of 66 μm.

(Formation of Liquid Crystal Panel)

An IPS mode liquid crystal panel was obtained in the same manner as in Comparative Example 1, except that the reflective polarizing film produced above was used as the light-source-side first polarizing plate, instead of the polarizing plate X. Specifically, the IPS mode liquid crystal panel had the reflective polarizing film (first polarizing plate) on the principal surface of the liquid crystal cell on the side of the light source, and the polarizing plate X (second polarizing plate) on the viewing-side principal surface.

(Production of Liquid Crystal Display Device)

The liquid crystal panel was assembled into the original liquid crystal display device, and the brightness of the white screen and the black screen displayed with a personal computer under the illumination of the light source of the liquid crystal display device was evaluated.

Table 1 presents the resin configuration and the characteristics of each layer of the uniaxially stretched multilayered film. Table 2 presents the physical properties of the uniaxially stretched multilayered film and the liquid crystal display device.

Examples 2 to 5

Reflective polarizing films including the uniaxially stretched multilayered film were obtained in the same manner as in Example 1, except that the resin composition, the layer thickness, and the producing conditions of each layer were changed as presented in Table 1.

Note that the NDC20PET used as the second-layer polyester in Example 2 is the same copolymerized polyester as the isophthalic acid 20 mol % copolymerized polyethylene terephthalate (IA20PET) used as the second-layer polyester in Example 1, except that the copolymer component was changed to 2,6-naphthalene dicarboxylic acid.

The ENA21PEN/PCTblend used as the second-layer polyester in Example 4 is a 2:1 weight ratio mixture of the first-layer polyester ENA21PEN of Example 4 (aromatic polyester containing 79 mol % of 2,6-naphthalenedicarboxylic acid component and 21 mol % of 6,6'-(ethylenedioxy)di-2-naphthoic acid component as the acid components, and ethylene glycol as the glycol component) and PCTA AN004 (polycyclohexane dimethylene terephthalate-isophthalate copolymer; Eastman Chemical).

A liquid crystal panel was obtained in the same manner as in Comparative Example 1, except that the reflective polarizing film produced above was used as the light-source-side first polarizing plate, instead of the polarizing plate X. Specifically, the liquid crystal panel had the reflective polarizing film (first polarizing plate) on the principal surface of the liquid crystal cell on the side of the light source, and the polarizing plate X (second polarizing plate) on the viewing-side principal surface.

The liquid crystal panel was assembled into the original liquid crystal display device, and the brightness of the white screen and the black screen displayed with a personal computer under the illumination of the light source of the liquid crystal display device was evaluated.

Table 1 presents the resin configuration and the characteristics of each layer of the uniaxially stretched multilayered film. Table 2 presents the physical properties of the uniaxially stretched multilayered film and the liquid crystal display device.

Exampls 6

A reflective polarizing film including the uniaxially stretched multilayered film was obtained in the same manner as in Example 1, except that the number of layers was increased (doubled) by a factor of 3 from the 1-unit laminated state.

Exampls 7

A reflective polarizing film including the uniaxially stretched multilayered film was obtained in the same manner as in Example 1, except that the number of layers was not increased (doubled) from the 1-unit laminated state.

Comparative Example 2

A uniaxially stretched multilayered film was obtained in the same manner as in Example 1, except that the first-layer thermoplastic resin and the second-layer thermoplastic resin were changed to polyethylene-2,6-naphthalene dicarboxylate (PEN) having an inherent viscosity (ortho-chlorophenol, 35° C.) of 0.62 dl/g, and terephthalic acid 64 mol % copolymerized polyethylene-2,6-naphthalene dicarboxylate (TA64PEN) having an inherent viscosity (ortho-chlorophenol, 35° C.) of 0.62 dl/g, respectively, and that the producing conditions were changed as presented in Table 1. The film was used as the first polarizing plate to form a liquid crystal panel, and a liquid crystal display device was produced.

Comparative Examples 3 to 10

Uniaxially stretched multilayered films were obtained in the same manner as in Example 1, except that the resin composition, the layer thickness, or the producing conditions were changed as presented in Table 1. The film was used as the first polarizing plate to form a liquid crystal panel, and a liquid crystal display device was produced.

All of the films had poor polarization performance compared to the Examples, and the percentage improved brightness was insufficient. Further, a hue change was greater than in Examples in at least one of x and y.

TABLE 1

| | First layer | | | | Second layer | | Unit thickness | | | Thickness | | | | |
|---|---|---|---|---|---|---|---|---|---|---|---|---|---|---|
| | Resin | Melting point (°C.) | Number of layers | | Resin | Number of layers | Number of optical interference layers | Thickness of outermost layer [μm] | Thickness of optical interference layer [μm] | Number of doublings | Total thickness [μm] | Thickness ratio (second layer/first layer) | First layer Minimum thickness [nm] | First layer Maximum thickness [nm] | Maximum/ minimum |
| Example 1 | ENA35PEN | 204 | 276 | | IA20PET | 274 | 550 | 3/3 | 27 | 2 | 66 | 2.6 | 67 | 148 | 2.2 |
| Example 2 | ENA12PEN | 247 | 276 | | NDC20PET | 274 | 550 | 5/5 | 27 | 2 | 74 | 2.6 | 67 | 148 | 2.2 |
| Example 3 | ENA21PEN | 230 | 276 | | NDC7IA4PET | 274 | 550 | 5/5 | 27 | 2 | 74 | 2.6 | 67 | 148 | 2.2 |
| Example 4 | ENA21PEN | 230 | 276 | | ENA21PEN/PCT blend | 274 | 550 | 5/5 | 27 | 2 | 74 | 2.6 | 67 | 148 | 2.2 |
| Example 5 | ENA35PEN | 204 | 276 | | IA20PET | 274 | 550 | 8/8 | 27 | 2 | 86 | 2.6 | 67 | 148 | 2.2 |
| Example 6 | ENA21PEN | 230 | 414 | | IA20PET | 411 | 825 | 6/6 | 27 | 3 | 117 | 2.6 | 67 | 148 | 2.2 |
| Example 7 | ENA21PEN | 230 | 138 | | IA20PET | 137 | 275 | 3/3 | 27 | 1 | 33 | 2.6 | 67 | 148 | 2.2 |
| Com. Ex. 2 | PEN | 269 | 138 | | TA64PET | 137 | 275 | 5/5 | 27 | 1 | 33 | 2.6 | 54 | 161 | 3.0 |
| Com. Ex. 3 | ENA3PEN | 263 | 138 | | IA20PET | 137 | 275 | 5/5 | 27 | 1 | 37 | 2.6 | 54 | 161 | 3.0 |
| Com. Ex. 4 | ENA70PEN | 267 | 138 | | IA20PET | 137 | 275 | 9/9 | 27 | 1 | 45 | 2.6 | 86 | 129 | 1.5 |
| Com. Ex. 5 | PEN | 269 | 138 | | IA20PET | 137 | 275 | 8/8 | 27 | 1 | 43 | 2.6 | 54 | 161 | 3.0 |
| Com. Ex. 6 | ENA21PEN | 230 | 138 | | IA20PET | 137 | 275 | 15/15 | 27 | 1 | 57 | 2.6 | 67 | 148 | 2.2 |
| Com. Ex. 7 | ENA21PEN | 230 | 138 | | IA20PET | 137 | 275 | 18/18 | 27 | 1 | 63 | 2.6 | 67 | 148 | 2.2 |
| Com. Ex. 8 | ENA35PEN | 204 | 276 | | IA20PET | 274 | 550 | 3/3 | 27 | 2 | 66 | 2.6 | 67 | 148 | 2.2 |
| Com. Ex. 9 | PEN | 269 | 138 | | TA15PEN | 137 | 275 | 5/5 | 27 | 1 | 37 | 2.6 | 54 | 161 | 3.0 |
| Com. Ex. 10 | ENA35PEN | 204 | 138 | | IA20PET | 137 | 275 | 3/3 | 27 | 1 | 33 | 2.6 | 34 | 75 | 2.2 |

| | Thickness Second layer | | | Stretch in machine direction | | Stretch in width direction | | | Heat fix |
|---|---|---|---|---|---|---|---|---|---|
| | Minimum thickness [nm] | Maximum thickness [nm] | Maximum/ minimum | Multiplication factor (rate) | Temperature (°C.) | Multiplication factor (rate) | Temperature (°C.) | Tow out | Temperature (°C.) |
| Example 1 | 175 | 384 | 2.2 | 1.0 | — | 5.2 | 120 | 15% | 120 |
| Example 2 | 175 | 384 | 2.2 | 1.0 | — | 4.5 | 120 | 15% | 120 |
| Example 3 | 175 | 384 | 2.2 | 1.0 | — | 4.6 | 120 | 10% | 120 |
| Example 4 | 175 | 384 | 2.2 | 1.0 | — | 4.6 | 125 | 10% | 125 |
| Example 5 | 175 | 384 | 2.2 | 1.0 | — | 5.2 | 120 | 15% | 120 |
| Example 6 | 175 | 384 | 2.2 | 1.0 | — | 5.2 | 120 | 10% | 120 |
| Example 7 | 175 | 384 | 2.2 | 1.0 | — | 5.2 | 120 | 10% | 120 |
| Com. Ex. 2 | 140 | 419 | 3.0 | 1.0 | — | 5.2 | 135 | 0% | 150 |
| Com. Ex. 3 | 140 | 419 | 3.0 | 1.0 | — | 5.1 | 135 | 0% | 150 |
| Com. Ex. 4 | 223 | 335 | 1.5 | 1.0 | — | 5.1 | 135 | 0% | 150 |
| Com. Ex. 5 | 140 | 419 | 3.0 | 1.0 | — | 5.1 | 135 | 0% | 150 |
| Com. Ex. 6 | 175 | 384 | 2.2 | 1.0 | — | 5.2 | 135 | 0% | 150 |

TABLE 1-continued

| | | | | | | | | |
|---|---|---|---|---|---|---|---|---|
| Com. Ex. 7 | 175 | 384 | 2.2 | 1.0 | — | 5.2 | 135 | 0% | 150 |
| Com. Ex. 8 | 175 | 384 | 2.2 | 1.0 | — | 5.2 | 135 | 0% | 150 |
| Com. Ex. 9 | 140 | 419 | 3.0 | 1.0 | — | 5.1 | 135 | 0% | 150 |
| Com. Ex. 10 | 89 | 195 | 2.2 | 1.0 | — | 5.2 | 135 | 0% | 120 |

TABLE 2

| | First-layer polymer | | | | Second-layer polymer | | | | Properties of outermost layer | |
|---|---|---|---|---|---|---|---|---|---|---|
| | Refractive index after uniaxial stretch | | | Average refractive | Refractive index after uniaxial stretch | | | Average refractive | Refractive index of outermost layer | |
| | nX | nY | nZ | index | nX | nY | nZ | index | nTD | nMD |
| Example 1 | 1.83 | 1.58 | 1.57 | 1.64 | 1.58 | 1.58 | 1.58 | 1.58 | 1.58 | 1.58 |
| Example 2 | 1.88 | 1.60 | 1.55 | 1.64 | 1.60 | 1.60 | 1.60 | 1.60 | 1.61 | 1.61 |
| Example 3 | 1.83 | 1.58 | 1.57 | 1.64 | 1.59 | 1.59 | 1.59 | 1.59 | 1.59 | 1.59 |
| Example 4 | 1.83 | 1.58 | 1.57 | 1.64 | 1.58 | 1.58 | 1.58 | 1.58 | 1.58 | 1.58 |
| Example 5 | 1.83 | 1.58 | 1.57 | 1.64 | 1.58 | 1.58 | 1.58 | 1.58 | 1.58 | 1.58 |
| Example 6 | 1.83 | 1.58 | 1.57 | 1.64 | 1.58 | 1.58 | 1.58 | 1.58 | 1.58 | 1.58 |
| Example 7 | 1.83 | 1.58 | 1.57 | 1.64 | 1.58 | 1.58 | 1.58 | 1.58 | 1.58 | 1.58 |
| Com. Ex. 1 | | | | | | | | | | |
| Com. Ex. 2 | 1.80 | 1.63 | 1.52 | 1.63 | 1.63 | 1.63 | 1.63 | 1.63 | 1.62 | 1.61 |
| Com. Ex. 3 | 1.82 | 1.63 | 1.52 | 1.63 | 1.58 | 1.58 | 1.58 | 1.58 | 1.58 | 1.58 |
| Com. Ex. 4 | 1.75 | 1.62 | 1.55 | 1.64 | 1.58 | 1.58 | 1.58 | 1.58 | 1.58 | 1.58 |
| Com. Ex. 5 | 1.80 | 1.63 | 1.52 | 1.63 | 1.58 | 1.58 | 1.58 | 1.58 | 1.58 | 1.58 |
| Com. Ex. 6 | 1.75 | 1.62 | 1.55 | 1.64 | 1.58 | 1.58 | 1.58 | 1.58 | 1.58 | 1.58 |
| Com. Ex. 7 | 1.75 | 1.62 | 1.55 | 1.64 | 1.58 | 1.58 | 1.58 | 1.58 | 1.58 | 1.58 |
| Com. Ex. 8 | 1.83 | 1.58 | 1.57 | 1.64 | 1.58 | 1.58 | 1.58 | 1.56 | 1.58 | 1.58 |
| Com. Ex. 9 | 1.80 | 1.63 | 1.52 | 1.64 | 1.67 | 1.63 | 1.60 | 1.63 | 1.67 | 1.63 |
| Com. Ex. 10 | 1.83 | 1.58 | 1.57 | 1.58 | 1.58 | 1.58 | 1.58 | 1.58 | 1.59 | 1.57 |

| | Properties of outermost layer | | | | | Reflective polarizing film 0° average reflectance | | | | |
|---|---|---|---|---|---|---|---|---|---|---|
| | Refractive index of outermost layer nZ | Thickness of outermost layer [um] | Retardation Re [nm] | Retardation Rth [nm] | Maximum orientation angle [deg] | p-polarized component [%] | s-polarized component [%] | Percentage brightness improvement | Hue | Contrast |
| Example 1 | 1.57 | 3 | 9 | 47 | 1.8 | 99.6 | 10.1 | Excellent | Excellent | Good |
| Example 2 | 1.60 | 5 | 5 | 48 | 0.8 | 98.9 | 10.8 | Excellent | Good | Good |
| Example 3 | 1.58 | 5 | 5 | 43 | 0.5 | 99.6 | 10.3 | Excellent | Excellent | Excellent |
| Example 4 | 1.58 | 5 | 5 | 2 | 0.5 | 99.5 | 10.1 | Excellent | Excellent | Excellent |
| Example 5 | 1.57 | 8 | 24 | 124 | 1.8 | 99.6 | 10.1 | Excellent | Poor | Good |
| Example 6 | 1.56 | 6 | 18 | 129 | 0.5 | 99.8 | 10.1 | Excellent | Poor | Excellent |
| Example 7 | 1.57 | 3 | 9 | 47 | 0.5 | 95.5 | 10.1 | Good | Good | Good |
| Com. Ex. 1 | | | | | | | | Poor | Excellent | Excellent |
| Com. Ex. 2 | 1.57 | 3 | 12 | 127 | 2.6 | 94.0 | 11.5 | Acceptable | Poor | Poor |
| Com. Ex. 3 | 1.56 | 5 | 15 | 108 | 3.0 | 85.0 | 32.0 | Poor | Good | Poor |
| Com. Ex. 4 | 1.56 | 9 | 27 | 194 | 2.5 | 68.2 | 18.6 | Poor | Good | Poor |
| Com. Ex. 5 | 1.56 | 8 | 24 | 172 | 4.0 | 88.2 | 24.0 | Poor | Poor | Poor |
| Com. Ex. 6 | 1.56 | 15 | 45 | 323 | 2.3 | 58.0 | 18.6 | Poor | Poor | Poor |
| Com. Ex. 7 | 1.56 | 18 | 54 | 387 | 2.2 | 88.0 | 18.6 | Acceptable | Good | Poor |
| Com. Ex. 8 | 1.57 | 5 | 15 | 78 | 4.0 | 99.6 | 10.1 | Excellent | Excellent | Poor |
| Com. Ex. 9 | 1.60 | 5 | 200 | 250 | 3.0 | 67.0 | 11.5 | Acceptable | Good | Poor |
| Com. Ex. 10 | 1.56 | 3 | 60 | 60 | 3.0 | 99.0 | 10.8 | Excellent | Good | Poor |

Comparative Example 11

A liquid crystal panel and a liquid crystal display device were produced according the methods described below, using the polarizing plate X produced in Comparative Example 1.
(Production of Liquid Crystal Panel)

A liquid crystal panel was removed from a liquid crystal television that included a VA mode liquid crystal cell and a direct illumination backlight (BRAVIA KDL-22EX300, 2010 model; Sony). The polarizing plate and the optical compensation film disposed on the both sides of the liquid crystal cell were detached, and the glass surfaces on the front and back of the liquid crystal cell were washed. Then, the polarizing plate X produced by using the method described in Comparative Example 1 was disposed on the light source-side of the liquid crystal cell via the acrylic adhesive along the absorption axis direction of the polarizing plate originally disposed on the light source side of the liquid crystal panel.

Then, the polarizing plate X was disposed on the viewing side of the liquid crystal cell via the acrylic adhesive along the absorption axis direction of the polarizing plate originally disposed on the viewing side of the liquid crystal panel. As a result, a VA mode liquid crystal panel was obtained that included the polarizing plates X disposed on the both principal surfaces of the liquid crystal cell.
(Production of Liquid Crystal Display Device)

The liquid crystal panel was assembled into the original liquid crystal display device, and the brightness of the white screen and the black screen displayed with a personal computer under the illumination of the light source of the liquid crystal display device was evaluated.

Example 8

Dimethyl 2,6-naphthalene dicarboxylate, 6,6'-(ethylenedioxy)di-2-naphthoic acid, and ethylene glycol were subjected to esterification reaction and ester exchange reaction in the presence of titanium tetrabutoxide. This was followed by polycondensation reaction to obtain an aromatic polyester that had an inherent viscosity of 0.62 dl/g, and contained the 2,6-naphthalenedicarboxylic acid component (PEN in the table) and the 6,6'-(ethylenedioxy)di-2-naphthoic acid component (ENA in the table) as the acid components in 65 mol % and 35 mol %, respectively, and ethylene glycol as the glycol component. The aromatic polyester was used as a first-layer resin, and an isophthalic acid 20 mol %, copolymerized polyethylene terephthalate (IA20PET) having an inherent viscosity (ortho-chlorophenol, 35° C.) of 0.62 dl/g was prepared as a second-layer thermoplastic resin.

The first-layer resin and the second-layer resin were dried at 170° C. for 5 hours, and fed to a first and a second extruder. After being heated to 300° C. to melt, the first-layer polyester and the second-layer polyester were separated into 138 layers and 137 layers, respectively, and a laminated melt with the total 275 layers of alternately laminated first layers and second layers was obtained with a multilayer feed block device, which was used to alternately laminate the first layer and the second layer in a manner allowing the maximum layer thickness to minimum layer thickness ratio to continuously vary to 2.2 in the first layer and the second layer. With the maintained laminated state, the same polyester used for the second layer was guided to a three-layer die from a third extruder on the both sides of the melt, and a thickness adjusting layer was laminated on the both sides of the laminated melt having a total of 275 layers. The feed amount through the third extruder was adjusted to make the thickness adjusting layer 27% of the total. With the maintained laminated state (hereinafter, also referred to as "1 unit"), the layers were divided in a 1:1 ratio in the direction perpendicular to the laminate direction, and laminated again so as to increase (double) the number of layers by a factor of 2. With the maintained laminated state, the layers were guided to a die, and cast onto a casting drum. The average layer thickness ratio of the first layer and the second layer was adjusted to 1.0:2.6. This completed the production of the multilayer unstretched film that included the thickness adjusting layers on the outermost sides as outermost layers.

The multilayer unstretched film was stretched 5.2 times in the width direction at a temperature of 120° C., and heat fixed for 3 seconds while being stretched 15% in the same direction at 120° C. The resulting reflective polarizing film had a thickness of 74 μm.

(Formation of Liquid Crystal Panel)

A VA mode liquid crystal panel was obtained in the same manner as in Comparative Example 11, except that the reflective polarizing film produced above was used as the light-source-side first polarizing plate, instead of the polarizing plate X. Specifically, the VA mode liquid crystal panel had the reflective polarizing film (first polarizing plate) on the principal surface of the liquid crystal cell on the side of the light source, and the polarizing plate X (second polarizing plate) on the viewing-side principal surface.

(Production of Liquid Crystal Display Device)

The liquid crystal panel was assembled into the original liquid crystal display device, and the brightness of the white screen and the black screen displayed with a personal computer under the illumination of the light source of the liquid crystal display device was evaluated.

Table 3 presents the resin configuration and the characteristics of each layer of the uniaxially stretched multilayered film. Table 4 presents the physical properties of the uniaxially stretched multilayered film and the liquid crystal display device.

The films had high polarization performance, and the percentage improved brightness, and contrast (degree of polarization) were sufficient in the evaluations performed with the VA mode liquid crystal display. Further, hue changes were sufficiently small even without the retardation plate.

Examples 9 to 10, and 12

Reflective polarizing films including the uniaxially stretched multilayered film were obtained in the same manner as in Example 8, except that the resin composition, the layer thickness, and the producing conditions of each layer were changed as presented in Table 3.

Note that the NDC20PET used as the second-layer polyester in Example 9 is the same copolymerized polyester as the isophthalic acid 20 mol % copolymerized polyethylene terephthalate (IA20PET) used as the second-layer polyester in Example 8, except that the copolymer component was changed to 2,6-naphthalene dicarboxylic acid.

The ENA21PEN/PCT blend used as the second-layer polyester in Example 10 is a 2:1 weight ratio mixture of the first-layer polyester ENA21PEN of Example 10 (aromatic polyester containing 79 mol % of 2,6-naphthalenedicarboxylic acid component and 21 mol % of 6,6'-(ethylenedioxy)di-2-naphthoic acid component as the acid components, and ethylene glycol as the glycol component) and PCTA AN004 (polycyclohexane dimethylene terephthalate-isophthalate copolymer; Eastman Chemical).

A liquid crystal panel was obtained in the same manner as in Comparative Example 11, except that the reflective polarizing film produced above was used as the light-source-side first polarizing plate, instead of the polarizing plate X. Specifically, the liquid crystal panel had the reflective polarizing film (first polarizing plate) on the principal surface of the liquid crystal cell on the side of the light source, and the polarizing plate X (second polarizing plate) on the viewing-side principal surface.

The liquid crystal panel was assembled into the original liquid crystal display device, and the brightness of the white screen and the black screen displayed with a personal computer under the illumination of the light source of the liquid crystal display device was evaluated.

Table 3 presents the resin configuration and the characteristics of each layer of the uniaxially stretched multilayered film. Table 4 presents the physical properties of the uniaxially stretched multilayered film and the liquid crystal display device.

Example 11

A reflective polarizing film including the uniaxially stretched multilayered film was obtained in the same manner as in Example 8, except that the number of layers was not increased (doubled) from the 1-unit laminated state.

Comparative Example 12

A uniaxially stretched multilayered film was obtained in the same manner as in Example 8, except that the first-layer thermoplastic resin and the second-layer thermoplastic resin were changed to polyethylene-2,6-naphthalene dicarboxylate (PEN) having an inherent viscosity (ortho-chlorophenol, 35° C.) of 0.62 dl/g, and terephthalic acid 64 mol % copolymerized polyethylene-2,6-naphthalene dicarboxylate (TA64PEN) having an inherent viscosity (ortho-chlorophenol, 35° C.) of 0.62 dl/g, respectively, and that the layer thickness and the producing conditions were changed as presented in Table 3. The film was used as the first polarizing plate to form a liquid crystal panel, and a liquid crystal display device was produced.

The film had poor polarization performance compared to those in the Examples, and the percentage improved brightness and contrast (degree of polarization) were insufficient. Further, a hue change was greater than in Examples.

Comparative Examples 13 to 20

Uniaxially stretched multilayered films were obtained in the same manner as in Example 8, except that the resin composition, the layer thickness, or the producing conditions were changed as presented in Table 3. The film was used as the first polarizing plate to form a liquid crystal panel, and a liquid crystal display device was produced.

All of the films had poor polarization performance compared to those in the Examples, and the percentage improved brightness and contrast (degree of polarization) were insufficient. Further, a hue change was greater than in Examples in at least one of x and y.

TABLE 3

| | First layer | | | Second layer | | Number of optical interference layers | Unit thickness | | | | Thickness | | | | | |
|---|---|---|---|---|---|---|---|---|---|---|---|---|---|---|---|---|
| | Resin | Melting point (°C) | Number of layers | Resin | Number of layers | | Thickness of outermost layer [μm] | Thickness of optical interference layer [μm] | Number of doublings | Total thickness [μm] | Thickness ratio (second layer/first layer) | First layer | | | |
| | | | | | | | | | | | | Minimum thickness [nm] | Maximum thickness [nm] | Maximum/ minimum |
| Example 8 | ENA35PEN | 204 | 276 | IA20PET | 274 | 550 | 5/5 | 27 | 2 | 74 | 2.6 | 67 | 148 | 2.2 |
| Example 9 | ENA12PEN | 247 | 276 | NDC20PET | 274 | 550 | 8/8 | 27 | 2 | 86 | 2.6 | 67 | 148 | 2.2 |
| Example 10 | ENA21PEN | 230 | 276 | ENA21PEN/PCT blend | 274 | 550 | 9/9 | 27 | 2 | 90 | 2.6 | 67 | 148 | 2.2 |
| Example 11 | ENA21PEN | 230 | 138 | IA20PET | 137 | 275 | 8/8 | 27 | 1 | 43 | 2.6 | 67 | 148 | 2.2 |
| Example 12 | ENA21PEN | 230 | 138 | IA20PET | 137 | 275 | 2/2 | 27 | 1 | 31 | 2.6 | 67 | 148 | 2.2 |
| Com. Ex. 12 | PEN | 269 | 138 | TA64PET | 137 | 275 | 3/3 | 27 | 1 | 33 | 2.6 | 54 | 161 | 3.0 |
| Com. Ex. 13 | ENA3PEN | 263 | 138 | IA20PET | 137 | 275 | 5/5 | 27 | 1 | 37 | 2.6 | 54 | 161 | 3.0 |
| Com. Ex. 14 | ENA70PEN | 267 | 138 | IA20PET | 137 | 275 | 9/9 | 27 | 1 | 45 | 2.6 | 86 | 129 | 1.5 |
| Com. Ex. 15 | PEN | 269 | 138 | IA20PET | 137 | 275 | 8/8 | 27 | 1 | 43 | 2.6 | 54 | 161 | 3.0 |
| Com. Ex. 17 | ENA21PEN | 230 | 138 | IA20PET | 137 | 275 | 15/15 | 27 | 1 | 57 | 2.6 | 67 | 148 | 2.2 |
| Com. Ex. 18 | ENA21PEN | 230 | 138 | IA20PET | 137 | 275 | 18/18 | 27 | 1 | 63 | 2.6 | 67 | 148 | 2.2 |
| Com. Ex. 19 | PEN | 269 | 138 | TA15PEN | 137 | 275 | 8/8 | 27 | 1 | 43 | 2.6 | 67 | 148 | 2.2 |
| Com. Ex. 20 | ENA35PEN | 204 | 138 | IA20PET | 137 | 275 | 5/5 | 27 | 1 | 37 | 2.6 | 54 | 161 | 3.0 |
| | | | | | | | 3/3 | 27 | 1 | 33 | 2.6 | 34 | 75 | 2.2 |

| | Thickness Second layer | | | Stretch in machine direction | | Stretch in width direction | | | Heat fix |
|---|---|---|---|---|---|---|---|---|---|
| | Minimum thickness [nm] | Maximum thickness [nm] | Maximum/ minimum | Multiplication factor (rate) | Temperature (°C) | Multiplication factor (rate) | Temperature (°C) | Tow out | Temperature (°C) |
| Example 8 | 175 | 384 | 2.2 | 1.0 | — | 5.2 | 120 | 15% | 120 |
| Example 9 | 175 | 384 | 2.2 | 1.0 | — | 4.5 | 120 | 15% | 120 |
| Example 10 | 175 | 384 | 2.2 | 1.0 | — | 5.2 | 125 | 10% | 125 |
| Example 11 | 175 | 384 | 2.2 | 1.0 | — | 5.2 | 120 | 10% | 120 |
| Example 12 | 175 | 384 | 2.2 | 1.0 | — | 5.2 | 120 | 0% | 120 |
| Com. Ex. 12 | 140 | 419 | 3.0 | 1.0 | — | 5.1 | 135 | 0% | 150 |
| Com. Ex. 13 | 140 | 419 | 3.0 | 1.0 | — | 5.1 | 135 | 0% | 150 |
| Com. Ex. 14 | 223 | 335 | 1.5 | 1.0 | — | 5.1 | 135 | 0% | 150 |
| Com. Ex. 15 | 140 | 419 | 3.0 | 1.0 | — | 5.1 | 135 | 0% | 150 |
| Com. Ex. 17 | 175 | 384 | 2.2 | 1.0 | — | 5.2 | 135 | 0% | 150 |
| Com. Ex. 18 | 175 | 384 | 2.2 | 1.0 | — | 5.2 | 135 | 0% | 150 |
| Com. Ex. 19 | 175 | 384 | 2.2 | 1.0 | — | 5.1 | 135 | 0% | 140 |
| Com. Ex. 20 | 140 | 419 | 3.0 | 1.0 | — | 5.2 | 135 | 0% | 150 |
| | 89 | 195 | 2.2 | 1.0 | — | 5.1 | 135 | 0% | 120 |

TABLE 4

| | First-layer polymer | | | | Second-layer polymer | | | | Properties of outermost layer | |
|---|---|---|---|---|---|---|---|---|---|---|
| | Refractive index after uniaxial stretch | | | Average refractive | Refractive index after uniaxial stretch | | | Average refractive | Refractive index of outermost layer | |
| | nX | nY | nZ | index | nX | nY | nZ | index | nTD | nMD |
| Example 8 | 1.83 | 1.58 | 1.57 | 1.64 | 1.58 | 1.58 | 1.58 | 1.58 | 1.58 | 1.58 |
| Example 9 | 1.88 | 1.60 | 1.55 | 1.64 | 1.60 | 1.60 | 1.60 | 1.60 | 1.61 | 1.61 |
| Example 10 | 1.83 | 1.58 | 1.57 | 1.64 | 1.58 | 1.58 | 1.58 | 1.58 | 1.58 | 1.58 |
| Example 11 | 1.83 | 1.58 | 1.57 | 1.64 | 1.58 | 1.58 | 1.58 | 1.58 | 1.58 | 1.58 |
| Example 12 | 1.83 | 1.58 | 1.57 | 1.64 | 1.58 | 1.58 | 1.58 | 1.58 | 1.58 | 1.58 |
| Com. Ex. 11 | | | | | | | | | | |
| Com. Ex. 12 | 1.80 | 1.63 | 1.52 | 1.63 | 1.63 | 1.63 | 1.63 | 1.63 | 1.62 | 1.61 |
| Com. Ex. 13 | 1.82 | 1.63 | 1.52 | 1.63 | 1.58 | 1.58 | 1.58 | 1.58 | 1.58 | 1.58 |
| Com. Ex. 14 | 1.75 | 1.62 | 1.55 | 1.64 | 1.58 | 1.58 | 1.58 | 1.58 | 1.58 | 1.58 |
| Com. Ex. 15 | 1.80 | 1.63 | 1.52 | 1.63 | 1.58 | 1.58 | 1.58 | 1.58 | 1.58 | 1.58 |
| Com. Ex. 16 | 1.75 | 1.62 | 1.55 | 1.64 | 1.58 | 1.58 | 1.58 | 1.58 | 1.58 | 1.58 |
| Com. Ex. 17 | 1.75 | 1.62 | 1.55 | 1.64 | 1.58 | 1.58 | 1.58 | 1.58 | 1.58 | 1.58 |
| Com. Ex. 18 | 1.83 | 1.58 | 1.57 | 1.64 | 1.58 | 1.58 | 1.58 | 1.58 | 1.58 | 1.58 |
| Com. Ex. 19 | 1.80 | 1.63 | 1.52 | 1.64 | 1.67 | 1.63 | 1.60 | 1.63 | 1.67 | 1.63 |
| Com. Ex. 20 | 1.83 | 1.58 | 1.57 | 1.58 | 1.58 | 1.58 | 1.58 | 1.58 | 1.59 | 1.57 |

| | Properties of outermost layer | | | | Reflective polarizing film | | | | | |
|---|---|---|---|---|---|---|---|---|---|---|
| | Refractive index of outermost layer nZ | Thickness of outermost layer [um] | Retardation Re [nm] | Retardation Rth [nm] | Maximum orientation angle [deg] | 0° average reflectance | | Percentage brightness improvement | Hue | Contrast |
| | | | | | | p-polarized component [%] | s-polarized component [%] | | | |
| Example 8 | 1.55 | 5 | 15 | 158 | 1.8 | 99.0 | 10.8 | Good | Good | Good |
| Example 9 | 1.58 | 8 | 24 | 260 | 0.8 | 98.9 | 11.0 | Good | Good | Good |
| Example 10 | 1.56 | 9 | 9 | 185 | 0.5 | 99.0 | 10.8 | Excellent | Good | Excellent |
| Example 11 | 1.56 | 8 | 24 | 172 | 0.5 | 99.5 | 10.8 | Good | Good | Good |
| Example 12 | 1.56 | 2 | 6 | 43 | 0.5 | 95.5 | 10.8 | Good | Acceptable | Good |
| Com. Ex. 11 | | | | | | | | Poor | Good | Excellent |
| Com. Ex. 12 | 1.57 | 3 | 12 | 127 | 2.6 | 94.0 | 11.5 | Acceptable | Poor | Poor |
| Com. Ex. 13 | 1.56 | 5 | 15 | 108 | 3.0 | 85.0 | 32.0 | Poor | Acceptable | Poor |
| Com. Ex. 14 | 1.56 | 9 | 27 | 194 | 2.5 | 68.2 | 18.6 | Poor | Acceptable | Poor |
| Com. Ex. 15 | 1.56 | 8 | 24 | 172 | 4.0 | 88.2 | 24.0 | Poor | Poor | Poor |
| Com. Ex. 16 | 1.56 | 15 | 45 | 323 | 2.3 | 58.0 | 18.6 | Poor | Poor | Poor |
| Com. Ex. 17 | 1.56 | 18 | 54 | 387 | 2.2 | 88.0 | 18.6 | Acceptable | Acceptable | Poor |
| Com. Ex. 18 | 1.56 | 8 | 24 | 172 | 5.0 | 95.5 | 10.8 | Good | Good | Poor |
| Com. Ex. 19 | 1.60 | 5 | 200 | 250 | 3.0 | 67.0 | 11.5 | Acceptable | Acceptable | Poor |
| Com. Ex. 20 | 1.56 | 3 | 60 | 60 | 3.0 | 99.0 | 10.8 | Excellent | Good | Poor |

Example 13

Dimethyl 2,6-naphthalene dicarboxylate, 6,6'-(ethylenedioxy)di-2-naphthoic acid, and ethylene glycol were subjected to esterification reaction and ester exchange reaction in the presence of titanium tetrabutoxide. This was followed by polycondensation reaction to obtain an aromatic polyester that had an inherent viscosity of 0.62 dl/g, and contained the 2,6-naphthalenedicarboxylic acid component (PEN in the table) and the 6,6'-(ethylenedioxy)di-2-naphthoic acid component (ENA in the table) as the acid components in 85 mol % and 15 mol %, respectively, and ethylene glycol as the glycol component. The aromatic polyester was used as the first-layer polyester.

Tricyclodecane dimethanol, ethylene glycol, and terephthalic acid were subjected to esterification reaction and ester exchange reaction in the presence of titanium tetrabutoxide. This was followed by polycondensation reaction to obtain an aromatic polyester that had an inherent viscosity of 0.60 dl/g, and contained the tricyclodecane dimethanol component (TCDM in the table) and the ethylene glycol component in 30 mol % and 70 mol %, respectively, as the diol components, and terephthalic acid as the acid component. The aromatic polyester was used as a second-layer polyester.

The first-layer polyester and the second-layer polyester were dried at 170° C. for 5 hours, and fed to a first and a second extruder. After being heated to 300° C. to melt, the first-layer polyester and the second-layer polyester were separated into 138 layers and 137 layers, respectively, and a laminated melt with the total 275 layers of alternately laminated first layers and second layers was obtained with a multilayer feed block device, which was used to alternately laminate the first layer and the second layer in a manner allowing the maximum layer thickness to minimum layer thickness ratio to continuously vary to 2.2 in the first layer and the second layer. With the maintained laminated state, the same polyester used for the second layer was guided to a three-layer die from a third extruder on the both sides of the melt, and a thickness adjusting layer was further laminated on the both sides of the laminated melt having a total of 275 layers. The feed amount through the third extruder was adjusted to make both the end layers (thickness adjusting layers) 18% of the total. With the maintained laminated state (hereinafter, also referred to as "1 unit"), the layers were divided in a 1:1 ratio in the direction perpendicular to the laminate direction, and laminated again so as to increase (double) the number of layers by a factor of 2. With the maintained laminated state, the layers were guided to a die, and cast onto a casting drum. The average layer thickness ratio of the first layer and the second layer was adjusted to 1.0:2.6. This completed the production of the multilayer unstretched film.

The multilayer unstretched film was stretched 5.2 times in the width direction at a temperature of 125° C., and heat fixed for 3 seconds while being further stretched 15% in the same direction at 125° C. The resulting film had a total thickness of 66 μm, and the laminate portion of the alternately laminated first layers and second layers (optical interference layer) contained 550 layers.

(Formation of Liquid Crystal Panel)

An IPS mode liquid crystal panel was obtained in the same manner as in Comparative Example 1, except that the reflective polarizing film produced above was used as the light-source-side first polarizing plate, instead of the polarizing plate X. Specifically, the IPS mode liquid crystal panel had the reflective polarizing film (first polarizing plate) on the principal surface of the liquid crystal cell on the side of the light source, and the polarizing plate X (second polarizing plate) on the viewing-side principal surface.

(Production of Liquid Crystal Display Device)

The liquid crystal panel was assembled into the original liquid crystal display device, and the brightness of the white screen and the black screen displayed with a personal computer under the illumination of the light source of the liquid crystal display device was evaluated.

Table 5 presents the resin configuration and the characteristics of each layer of the reflective polarizing film formed from the uniaxially stretched multilayered film. Table 6 presents the physical properties of the reflective polarizing film and the liquid crystal display device.

Examples 14 to 23

Reflective polarizing films including the uniaxially stretched multilayered film, and liquid crystal display devices were obtained in the same manner as in Example 13, except that the resin composition or the layer thickness of each layer was changed as presented in Table 5. The stretch temperature and the heat fix temperature were adjusted according to the Tg of the polymer forming the first layer. Table 6 presents the physical properties of the reflective polarizing films and the liquid crystal display devices.

Example 24

A reflective polarizing film including the uniaxially stretched multilayered film, and a liquid crystal display device were obtained in the same manner as in Example 13, except that the number of layers was increased (doubled) by a factor of 3 from the 1-unit laminated state. Table 6 presents the physical properties of the reflective polarizing film and the liquid crystal display device.

Example 25

A reflective polarizing film including the uniaxially stretched multilayered film, and a liquid crystal display device were obtained in the same manner as in Example 13, except that the number of layers was not increased (doubled) from the 1-unit laminated state. Table 6 presents the physical properties of the reflective polarizing film and the liquid crystal display device.

Comparative Example 21

A reflective polarizing film including the uniaxially stretched multilayered film was obtained in the same manner as in Example 13, except that the first-layer polyester and the second-layer polyester were changed to polyethylene-2,6-naphthalene dicarboxylate (PEN) having an inherent viscosity (ortho-chlorophenol, 35° C.) of 0.62 dl/g and isophthalic acid 10 mol % copolymerized polyethylene terephthalate (IA10PET) having an inherent viscosity (ortho-chlorophenol, 35° C.) of 0.62 dl/g, respectively, and that the number of layers was not increased (doubled) from the 1-unit laminated state. The reflective polarizing film was used as a first polarizing plate to form a liquid crystal panel, and a liquid crystal display device was produced in the same manner as in Example 13. Table 6 presents the physical properties of the reflective polarizing film and the liquid crystal display device.

Comparative Example 22

A reflective polarizing film including the uniaxially stretched multilayered film, and a liquid crystal display device were obtained in the same manner as in Comparative Example 21, except that the second-layer polyester was changed to terephthalic acid 45 mol % copolymerized polyethylene-2,6-naphthalene dicarboxylate (TA45PEN) having an inherent viscosity (ortho-chlorophenol, 35° C.) of 0.62 dl/g as presented in Table 5. Table 6 presents the physical properties of the reflective polarizing film.

Example 26

A reflective polarizing film including the uniaxially stretched multilayered film was obtained in the same manner as in Example 13, except that the feed amount through the third extruder was adjusted to make both the end layers (thickness adjusting layers) 27% of the total film thickness.

A VA mode liquid crystal panel was obtained in the same manner as in Comparative Example 11, except that the reflective polarizing film produced above was used as the light-source-side first polarizing plate, instead of the polarizing plate X. Specifically, the VA mode liquid crystal panel had the reflective polarizing film (first polarizing plate) on the principal surface of the liquid crystal cell on the side of the light source, and the polarizing plate X (second polarizing plate) on the viewing-side principal surface.

The liquid crystal panel was assembled into the original liquid crystal display device, and the brightness of the white screen and the black screen displayed with a personal computer under the illumination of the light source of the liquid crystal display device was evaluated.

Table 5 presents the resin configuration and the characteristics of each layer of the reflective polarizing film obtained as above. Table 6 presents the physical properties of the reflective polarizing film and the liquid crystal display device.

Example 27

A reflective polarizing film including the uniaxially stretched multilayered film, and a liquid crystal display device were obtained in the same manner as in Example 26, except that the feed amount through the third extruder was adjusted to make both the end layers (thickness adjusting layers) 37% of the total film thickness. Evaluations were performed in the same manner as in Example 26. The results are presented in Table 6.

TABLE 5

| | First layer | | Second layer | | | Number of optical interference layers | Thickness | | | | Thickness ratio (second layer/first layer) | First Layer Minimum thickness [nm] |
|---|---|---|---|---|---|---|---|---|---|---|---|---|
| | | | | | | | Unit Thickness | | | | | |
| | Resin | Number of layers | Resin | Number of layers | Tg (°C.) | | Thickness of thickness adjusting layer [um] | Thickness of optical interference layer [um] | Number of doublings | Total thickness [um] | | |
| Example 13 | C2NA15PEN | 276 | TCDM30PET | 274 | 92 | 550 | 3/3 | 27 | 2 | 66 | 2.6 | 34 |
| Example 14 | C2NA21PEN | 276 | SPG10PET | 274 | 83 | 550 | 3/3 | 27 | 2 | 66 | 2.6 | 34 |
| Example 15 | C2NA27PEN | 276 | SPG20PET | 274 | 87 | 550 | 3/3 | 27 | 2 | 66 | 2.6 | 34 |
| Example 16 | C2NA35PEN | 276 | SPG30PET | 274 | 92 | 550 | 3/3 | 27 | 2 | 66 | 2.6 | 34 |
| Example 17 | C2NA27PEN | 276 | NDC30SPG60PET | 274 | 114 | 550 | 3/3 | 27 | 2 | 66 | 2.6 | 34 |
| Example 18 | C2NA15PEN | 276 | SPG70PEN | 274 | 153 | 550 | 3/3 | 27 | 2 | 66 | 2.6 | 34 |
| Example 19 | C2NA27PEN | 276 | CHDC35SPG70PEN | 274 | 98 | 550 | 3/3 | 27 | 2 | 66 | 2.6 | 34 |
| Example 20 | C2NA15PEN | 276 | DHQE40PEN | 274 | 92 | 550 | 3/3 | 27 | 2 | 66 | 2.6 | 34 |
| Example 21 | C2NA27PTN | 276 | TCDM30PET | 274 | 92 | 550 | 3/3 | 27 | 2 | 66 | 2.6 | 34 |
| Example 22 | C2NA26PBN | 276 | TCDM30PET | 274 | 92 | 550 | 3/3 | 27 | 2 | 66 | 2.6 | 34 |
| Example 23 | C3NA27PEN | 276 | TCDM30PET | 274 | 92 | 550 | 3/3 | 27 | 2 | 66 | 2.6 | 34 |
| Example 24 | C2NA15PEN | 414 | TCDM30PET | 411 | 92 | 825 | 3/3 | 27 | 3 | 99 | 2.6 | 34 |
| Example 25 | C2NA15PEN | 138 | TCDM30PET | 137 | 92 | 275 | 3/3 | 27 | 1 | 33 | 2.6 | 34 |
| Com. Ex. 21 | PEN | 138 | IA10PET | 137 | 78 | 275 | 3/3 | 27 | 1 | 33 | 2.6 | 34 |
| Com. Ex. 22 | PEN | 138 | TA45PEN | 137 | 110 | 275 | 3/3 | 27 | 1 | 33 | 2.6 | 34 |
| Example 26 | C2NA15PEN | 276 | TCDM30PET | 274 | 92 | 550 | 5/5 | 27 | 2 | 74 | 2.6 | 34 |
| Example 27 | C2NA15PEN | 276 | TCDM30PET | 274 | 92 | 550 | 8/8 | 27 | 2 | 86 | 2.6 | 34 |

| | Thickness | | | | | Stretch in machine direction | | Stretch in width direction | | | |
|---|---|---|---|---|---|---|---|---|---|---|---|
| | First Layer | | Second Layer | | | | | | | | |
| | Maximum thickness [nm] | Maximum/minimum | Minimum thickness [nm] | Maximum thickness [nm] | Maximum/minimum | Multiplication factor (rate) | Temperature (°C.) | Multiplication factor (rate) | Temperature (°C.) | Tow out | Heat fix (°C.) |
| Example 13 | 75 | 2.2 | 89 | 195 | 2.2 | 1.0 | — | 5.2 | 125 | 15% | 125 |
| Example 14 | 75 | 2.2 | 89 | 195 | 2.2 | 1.0 | — | 5.2 | 125 | 15% | 125 |
| Example 15 | 75 | 2.2 | 89 | 195 | 2.2 | 1.0 | — | 5.2 | 125 | 10% | 125 |
| Example 16 | 75 | 2.2 | 89 | 195 | 2.2 | 1.0 | — | 5.2 | 135 | 10% | 135 |
| Example 17 | 75 | 2.2 | 89 | 195 | 2.2 | 1.0 | — | 5.2 | 135 | 10% | 135 |
| Example 18 | 75 | 2.2 | 89 | 195 | 2.2 | 1.0 | — | 5.2 | 125 | 10% | 125 |
| Example 19 | 75 | 2.2 | 89 | 195 | 2.2 | 1.0 | — | 5.2 | 125 | 10% | 125 |
| Example 20 | 75 | 2.2 | 89 | 195 | 2.2 | 1.0 | — | 5.2 | 125 | 10% | 125 |
| Example 21 | 75 | 2.2 | 89 | 195 | 2.2 | 1.0 | — | 5.2 | 125 | 10% | 125 |
| Example 22 | 75 | 2.2 | 89 | 195 | 2.2 | 1.0 | — | 5.2 | 120 | 10% | 120 |
| Example 23 | 75 | 2.2 | 89 | 195 | 2.2 | 1.0 | — | 4.0 | 120 | 10% | 120 |
| Example 24 | 75 | 2.2 | 89 | 195 | 2.2 | 1.0 | — | 5.2 | 125 | 10% | 125 |
| Example 25 | 75 | 2.2 | 89 | 195 | 2.2 | 1.0 | — | 5.2 | 125 | 10% | 125 |
| Com. Ex. 21 | 75 | 2.2 | 89 | 195 | 2.2 | 1.0 | — | 5.2 | 135 | 0% | 150 |
| Com. Ex. 22 | 75 | 2.2 | 89 | 195 | 2.2 | 1.0 | — | 5.2 | 135 | 0% | 150 |
| Example 26 | 75 | 2.2 | 89 | 195 | 2.2 | 1.0 | — | 5.2 | 125 | 15% | 125 |
| Example 27 | 75 | 2.2 | 89 | 195 | 2.2 | 1.0 | — | 5.2 | 125 | 15% | 125 |

TABLE 6

| | First-layer polymer | | | | Second-layer polymer | | | | Properties of outermost layer | | | |
|---|---|---|---|---|---|---|---|---|---|---|---|---|
| | Refractive index after unidirectional stretch | | | Average refractive index | Refractive index after unidirectional stretch | | | Average refractive index | Refractive index of outermost layer | | | Thickness of outermost layer [um] |
| | nX | nY | nZ | | nX | nY | nZ | | nTD | nMD | nZ | |
| Example 13 | 1.85 | 1.58 | 1.54 | 1.66 | 1.58 | 1.58 | 1.58 | 1.58 | 1.58 | 1.58 | 1.57 | 3 |
| Example 14 | 1.87 | 1.57 | 1.54 | 1.66 | 1.57 | 1.57 | 1.57 | 1.57 | 1.57 | 1.57 | 1.56 | 3 |
| Example 15 | 1.89 | 1.56 | 1.55 | 1.67 | 1.57 | 1.57 | 1.57 | 1.57 | 1.57 | 1.57 | 1.56 | 3 |
| Example 16 | 1.91 | 1.56 | 1.55 | 1.67 | 1.56 | 1.56 | 1.56 | 1.56 | 1.57 | 1.56 | 1.56 | 3 |
| Example 17 | 1.89 | 1.56 | 1.55 | 1.67 | 1.56 | 1.56 | 1.56 | 1.56 | 1.56 | 1.56 | 1.56 | 3 |

TABLE 6-continued

| | | | | | | | | | | | |
|---|---|---|---|---|---|---|---|---|---|---|---|
| Example 18 | 1.85 | 1.58 | 1.54 | 1.66 | 1.59 | 1.59 | 1.59 | 1.59 | 1.59 | 1.58 | 3 |
| Example 19 | 1.89 | 1.56 | 1.55 | 1.67 | 1.56 | 1.56 | 1.56 | 1.56 | 1.56 | 1.56 | 3 |
| Example 20 | 1.85 | 1.58 | 1.54 | 1.66 | 1.58 | 1.58 | 1.58 | 1.58 | 1.58 | 1.57 | 3 |
| Example 21 | 1.76 | 1.60 | 1.57 | 1.64 | 1.58 | 1.58 | 1.58 | 1.59 | 1.58 | 1.57 | 3 |
| Example 22 | 1.76 | 1.60 | 1.57 | 1.64 | 1.58 | 1.58 | 1.58 | 1.59 | 1.58 | 1.57 | 3 |
| Example 23 | 1.85 | 1.57 | 1.54 | 1.65 | 1.58 | 1.58 | 1.58 | 1.59 | 1.58 | 1.57 | 3 |
| Example 24 | 1.85 | 1.58 | 1.54 | 1.66 | 1.58 | 1.58 | 1.58 | 1.59 | 1.58 | 1.57 | 3 |
| Example 25 | 1.85 | 1.58 | 1.54 | 1.66 | 1.58 | 1.58 | 1.58 | 1.59 | 1.58 | 1.57 | 3 |
| Com. Ex. 21 | 1.80 | 1.63 | 1.52 | 1.65 | 1.58 | 1.58 | 1.58 | 1.58 | 1.58 | 1.56 | 3 |
| Com. Ex. 22 | 1.80 | 1.63 | 1.52 | 1.65 | 1.63 | 1.63 | 1.63 | 1.58 | 1.58 | 1.56 | 3 |
| Example 26 | 1.85 | 1.58 | 1.54 | 1.66 | 1.58 | 1.58 | 1.58 | 1.58 | 1.58 | 1.55 | 5 |
| Example 27 | 1.85 | 1.58 | 1.54 | 1.66 | 1.58 | 1.58 | 1.58 | 1.58 | 1.58 | 1.55 | 8 |

| | Properties of outermost layer | | | Optical characteristics | | | | | | | |
|---|---|---|---|---|---|---|---|---|---|---|---|
| | Re-tardation Re [nm] | Re-tardation Rth [nm] | Maximum orientation angle [deg] | at 0° incidence Average reflectance | | | Rate of thermal shrinkage 85° C. × 30 min | | | Percentage brightness improvement [%] | |
| | | | | p-polarized component [%] | s-polarized component [%] | Haze | MD [%] | TD [%] | Contrast | Hue [%] | Durability evaluation [%] |
| Example 13 | 9 | 47 | 1.8 | 99.3% | 10.8% | 0.3 | 0.5% | 0.6% | Excellent | Excellent | Good | Good |
| Example 14 | 12 | 36 | 0.8 | 99.5% | 10.2% | 0.8 | 0.8% | 1.2% | Excellent | Excellent | Good | Acceptable |
| Example 15 | 9 | 34 | 0.5 | 99.6% | 10.2% | 0.3 | 0.7% | 1.0% | Excellent | Excellent | Excellent | Acceptable |
| Example 16 | 15 | 23 | 0.5 | 99.8% | 9.7% | 0.4 | 0.5% | 0.6% | Excellent | Excellent | Excellent | Good |
| Example 17 | 9 | 17 | 0.5 | 99.7% | 10.8% | 0.3 | 0.2% | 0.3% | Excellent | Excellent | Excellent | Excellent |
| Example 18 | 6 | 33 | 0.5 | 99.6% | 10.8% | 0.4 | 0.1% | 0.1% | Excellent | Excellent | Good | Excellent |
| Example 19 | 9 | 20 | 1.5 | 99.3% | 10.8% | 0.3 | 0.5% | 0.6% | Excellent | Excellent | Excellent | Good |
| Example 20 | 6 | 48 | 1.3 | 98.8% | 11.0% | 0.3 | 0.5% | 0.6% | Excellent | Excellent | Good | Good |
| Example 21 | 15 | 43 | 1.2 | 99.0% | 10.8% | 0.3 | 0.5% | 0.6% | Good | Good | Good | Good |
| Example 22 | 15 | 43 | 1.6 | 99.0% | 10.8% | 0.4 | 0.5% | 0.6% | Good | Good | Good | Good |
| Example 23 | 15 | 43 | 1.6 | 99.3% | 10.8% | 0.4 | 0.5% | 0.6% | Excellent | Good | Good | Good |
| Example 24 | 15 | 43 | 1.3 | 99.5% | 10.8% | 0.3 | 0.5% | 0.6% | Excellent | Excellent | Good | Good |
| Example 25 | 15 | 43 | 1.4 | 99.1% | 10.8% | 0.3 | 0.5% | 0.6% | Good | Good | Good | Good |
| Com. Ex. 21 | 9 | 65 | 8.5 | 88.2% | 24.0% | 2.3 | 5.6% | 7.6% | Poor | Poor | Poor | Poor |
| Com. Ex. 22 | 9 | 65 | 9.5 | 92.0% | 12.0% | 0.7 | 0.5% | 0.7% | Poor | Acceptable | Acceptable | Good |
| Example 26 | 13 | 142 | 1.8 | 99.3% | 10.8% | 0.3 | 0.5% | 0.6% | Excellent | Excellent | Good | Good |
| Example 27 | 24 | 252 | 1.6 | 99.3% | 10.8% | 0.3 | 0.5% | 0.6% | Excellent | Excellent | Good | Good |

The compositions of the polyesters presented in Table 5 are as follows.

TABLE 7

| Indication in Table 1 | Dicarboxylic acid component | | Diol component | |
|---|---|---|---|---|
| | Component/mol % | Component/mol % | Component/mol % | Component/mol % |
| C2NA15PEN | C2NA/15 | NDC/85 | | EG/100 |
| C2NA21PEN | C2NA/21 | NDC/79 | | EG/100 |
| C2NA27PEN | C2NA/27 | NDC/73 | | EG/100 |
| C2NA35PEN | C2NA/35 | NDC/65 | | EG/100 |
| C2NA27PTN | C2NA/27 | NDC/73 | | TMG/100 |
| C2NA26PBN | C2NA/26 | NDC/74 | | BD/100 |
| C3NA27PEN | C3NA/27 | NDC/73 | | EG/100 |
| PEN | | NDC/100 | | EG/100 |
| TCDM30PET | | TA/100 | TCDM/30 | EG/70 |
| SPG10PET | | TA/100 | SPG/10 | EG/90 |
| SPG20PET | | TA/100 | SPG/20 | EG/80 |
| SPG30PET | | TA/100 | SPG/30 | EG/70 |
| NDC30SPG60PET | NDC/30 | TA/70 | SPG/60 | EG/40 |
| SPG70PEN | | NDC/100 | SPG/70 | EG/30 |
| CHDC35SPG70PEN | SHDC/35 | NDC/65 | SPG/70 | EG/30 |
| DHQE40PEN | DHQE/40 | NDC/60 | | EG/100 |

TABLE 7-continued

| Indication in | Dicarboxylic acid component | | Diol component | |
|---|---|---|---|---|
| Table 1 | Component/mol % | Component/mol % | Component/mol % | Component/mol % |
| IA10PET | IA/10 | TA/90 | | EG/100 |
| TA45PEN | TA/45 | NDC/55 | | EG/100 |

C2NA: 6,6'-(ethylenedioxy)di-2-naphthoic acid
NDC: 2,6-naphthalene dicarboxylic acid
EG: ethylene glycol
PEN: polyethylene-2,6-naphthalene dicarboxylate
TMG: trimethylene glycol
PTN: polytrimethylene-2,6-naphthalene dicarboxylate
BD: 1,4-butanediol
PBN: polybutylene-2,6-naphthalene dicarboxylate
C3NA: 6,6'-(trimethylenedioxy)di-2-naphthoic acid
TA: terephthalic acid
PET: polyethylene terephthalate
TCDM: tricyclodecane dimethanol
SPG: spiroglycol
CHDC: cyclohexane dicarboxylic acid
DHQE: decahydronaphthalene dicarboxylic acid
IA: isophthalic acid

INDUSTRIAL APPLICABILITY

The reflective polarizing film of the present invention has high polarization performance comparable to that of an absorption-type polarizing plate, despite that the reflective polarizing film includes a uniaxially stretched multilayered film. The present invention can thus provide a multilayered reflective polarizing film preferred as a polarizing plate attached to a liquid crystal cell, and an optical member for liquid crystal display devices, and a liquid crystal display device formed from such a multilayered reflective polarizing film.

The invention claimed is:

1. A reflective polarizing film that comprises a uniaxially stretched multilayered film as a laminate of at least 251 alternately laminated first layers and second layers, wherein:
   1) the first layers of the uniaxially stretched multilayered film are formed of a polyester containing dicarboxylic acid components and a diol component,
      (i) the dicarboxylic acid components containing 5 mol % to 50 mol % of a component represented by the following formula (A), and 50 mol % to 95 mol % of a component represented by the following formula (B),

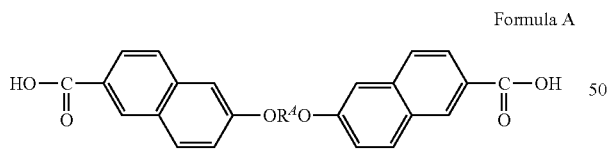

Formula A wherein $R^A$ represents an alkylene group of 2 to 4 carbon atoms,

Formula B wherein $R^B$ represents a naphthalenediyl group,
      (ii) the diol component containing 90 mol % to 100 mol % of a component represented by the following formula (C),

Formula C wherein $R^C$ represents an alkylene group of 2 to 4 carbon atoms,
   2) the second layers of the uniaxially stretched multilayered film are formed of an optically isotropic polyester having an average refractive index of 1.50 to 1.60,
   3) the refractive index difference between the first layers and the second layers is 0.10 to 0.45 in a uniaxial stretch direction (X direction) within a film plane, and is 0.05 or less in a direction (Y direction) orthogonal to the uniaxial stretch direction, and in a film thickness direction (Z direction), and
   4) the reflective polarizing film has an angle of orientation of 2 degrees or less, wherein said angle of orientation represents the tilt of the in-plane principal orientation axis with respect to the width direction of the film.

2. The reflective polarizing film according to claim 1, comprising an outermost layer on at least one of the surfaces of the uniaxially stretched multilayered film,
   wherein the retardation (Re) of the outermost layer as represented by the following formula (1) is 0 nm or more and less than 20 nm, $$\text{retardation}(Re) = |nTD - nMD| \times 1000 \times d \quad \text{Formula 1}$$

wherein nMD and nTD represent the refractive indices of the outermost layer in a machine direction and a width direction, respectively, and d represents the thickness (μm) of the outermost layer, and
   wherein the outermost layer has a thickness of 2 μm to 10 μm.

3. The reflective polarizing film according to claim 2, wherein the retardation (Rth) of the outermost layer in the thickness direction as represented by the following formula (2) is 0 nm or more and less than 50 nm, $$\text{retardation}(Rth) = ((nMD + nTD)/2 - nZ) \times 1000 \times d \quad \text{Formula 2}$$

wherein nMD, nTD, and nZ represent the refractive indices of the outermost layer in the machine direction, the width direction, and the thickness direction, respectively, and d represents the thickness (μm) of the outermost layer.

4. A reflective polarizing plate for IPS mode liquid crystal displays, wherein the reflective polarizing plate is formed from the reflective polarizing film of claim 2.

5. The reflective polarizing film according to claim 1, comprising an outermost layer on at least one of the surfaces of the uniaxially stretched multilayered film, wherein the retardation (Re) of the outermost layer as represented by the following formula (1) is 0 nm to 30 nm, and the retardation (Rth) of the outermost layer in the thickness direction as represented by the following formula (2) is 50 nm to 350 nm, $$\text{retardation}(Re) = |nTD - nMD| \times 1000 \times d \quad (1)$$

wherein nMD and nTD represent the refractive indices of the outermost layer in a machine direction and a width direction, respectively, and d represents the thickness (μm) of the outermost layer, $$\text{retardation}(Rth) = ((nMD + nTD)/2 - nZ) \times 1000 \times d \quad (2)$$

(wherein nMD, nTD, and nZ represent the refractive indices of the outermost layer in the machine direction, the width direction, and the thickness direction, respectively, and d represents the thickness (μm) of the outermost layer), and wherein the outermost layer has a thickness of 5 μm to 50 μm.

6. A reflective polarizing film for VA mode liquid crystal displays, wherein the reflective polarizing film is formed from the reflective polarizing film of claim 5.

7. A reflective polarizing plate for VA mode liquid crystal displays, wherein the reflective polarizing plate is formed from the reflective polarizing film of claim 5.

8. The reflective polarizing film according to claim 1, wherein the average reflectance at 400 to 800 nm wavelengths for polarized light incident at 0 degree angle and reflected at the film surface of reflective polarizing film is 95% or more with regard to a polarized component parallel to an incident plane that includes the uniaxial stretch direction (X direction), and wherein the average reflectance at 400 to 800 nm wavelengths for the polarized light incident at 0 degree angle and reflected at the film surface of reflective polarizing film is 12% or less with regard to a polarized component perpendicular to the incident plane that includes the X direction.

9. The reflective polarizing film according to claim 1, wherein the polyester forming the second layers is a polyester that contains copolymerized polyethylene terephthalate as a main component.

10. The reflective polarizing film according to claim 2, wherein the outermost layer is formed of amorphous thermoplastic resin.

11. The reflective polarizing film according to claim 1, wherein the polyester forming the second layers is a copolymerized polyester having a glass transition point of 80° C. or more.

12. The reflective polarizing film according to claim 11, wherein the reflective polarizing film has a rate of thermal shrinkage of 1.5% or less under 85° C., 30 minute conditions.

13. The reflective polarizing film according to claim 11, wherein the copolymerized polyester forming the second layer is a copolymerized polyethylene terephthalate that contains alicyclic diol as a copolymer component.

14. The reflective polarizing film according to claim 13, wherein the copolymer component forming the copolymerized polyethylene terephthalate is at least one selected from the group consisting of spiroglycol, tricyclodecane dimethanol, and cyclohexane dimethanol.

15. The reflective polarizing film according to claim 11, wherein the copolymerized polyester forming the second layers is a copolymerized polyethylene naphthalate that contains at least one of alicyclic dicarboxylic acid and alicyclic diol as a copolymer component.

16. The reflective polarizing film according to claim 15, wherein the copolymer component forming the copolymerized polyethylene naphthalate is at least one selected from the group consisting of cyclohexane dicarboxylic acid, decahydronaphthalene dicarboxylic acid, spiroglycol, tricyclodecane dimethanol, and cyclohexane dimethanol.

17. An optical member for liquid crystal display devices, the optical member comprising a first polarizing plate formed from the reflective polarizing film of claim 1, a liquid crystal cell, and a second polarizing plate, wherein the first polarizing plate, the liquid crystal cell, and the second polarizing plate are laminated in this order.

18. The optical member for liquid crystal display devices according to claim 17, wherein the second polarizing plate is formed from a reflective polarizing film that comprises a uniaxially stretched multilayered film as a laminate of at least 251 alternately laminated first layers and second layers, wherein:

1) the first layers of the uniaxially stretched multilayered film are formed of a polyester containing dicarboxylic acid components and a diol component,
   (i) the dicarboxylic acid components containing 5 mol % to 50 mol % of a component represented by the following formula (A), and 50 mol % to 95 mol % of a component represented by the following formula (B), Formula A

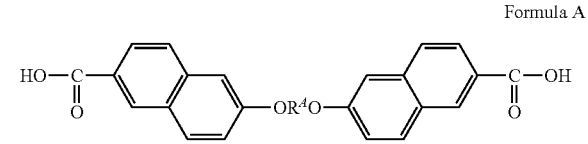

wherein $R^A$ represents an alkylene group of 2 to 4 carbon atoms,

Formula B

wherein $R^B$ represents a naphthalenediyl group, (ii) the diol component containing 90 mol % to 100 mol % of a component represented by the following formula (C),

Formula C wherein $R^C$ represents an alkylene group of 2 to 4 carbon atoms, 2) the second layers of the uniaxially stretched multilayered film are formed of an optically isotropic polyester having an average refractive index of 1.50 to 1.60,
3) the refractive index difference between the first layers and the second layers is 0.10 to 0.45 in a uniaxial stretch direction (X direction) within a film plane, and is 0.05 or less in a direction (Y direction) orthogonal to the uniaxial stretch direction, and in a film thickness direction (Z direction), and
4) the reflective polarizing film has an angle of orientation of 2 degrees or less, wherein said angle of orientation represents the tilt of the in-plane principals orientation axis with respect to the width direction of the film.

19. A liquid crystal display device, comprising a light source, and the optical member for liquid crystal display devices according to claim 17, wherein the first polarizing plate is disposed on the side of the light source.

20. The reflective polarizing film according to claim 5, wherein the outermost layer is formed of amorphous thermoplastic resin.

* * * * *